(12) United States Patent
Madi et al.

(10) Patent No.: US 11,677,762 B2
(45) Date of Patent: Jun. 13, 2023

(54) APPARATUS AND METHOD FOR EVALUATING MULTIPLE ASPECTS OF THE SECURITY FOR VIRTUALIZED INFRASTRUCTURE IN A CLOUD ENVIRONMENT

(71) Applicant: Telefonaktiebolaget LM Ericsson (publ), Stockholm (SE)

(72) Inventors: Taous Madi, Montreal (CA); Mengyuan Zhang, Montreal (CA); Yosr Jarraya, Montreal (CA); Lingyu Wang, Montreal (CA); Makan Pourzandi, Montreal (CA); Mourad Debbabi, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 138 days.

(21) Appl. No.: 17/046,458

(22) PCT Filed: Apr. 23, 2019

(86) PCT No.: PCT/IB2019/053352
§ 371 (c)(1),
(2) Date: Oct. 9, 2020

(87) PCT Pub. No.: WO2019/207486
PCT Pub. Date: Oct. 31, 2019

(65) Prior Publication Data
US 2021/0152572 A1   May 20, 2021

Related U.S. Application Data

(60) Provisional application No. 62/661,410, filed on Apr. 23, 2018.

(51) Int. Cl.
*H04L 9/40*    (2022.01)

(52) U.S. Cl.
CPC ...... *H04L 63/1416* (2013.01); *H04L 63/1433* (2013.01); *H04L 63/1441* (2013.01); *H04L 63/20* (2013.01)

(58) Field of Classification Search
CPC ............. H04L 63/1416; H04L 63/1433; H04L 63/1441; H04L 63/20
(Continued)

(56) References Cited

U.S. PATENT DOCUMENTS 9,363,282 B1 *   6/2016   Yu ........................ H04L 63/1441
11,252,188 B1 *   2/2022   Lantuh .................... G06N 5/025
(Continued)

OTHER PUBLICATIONS

International Search Report and Written Opinion dated Jul. 18, 2019 issued in PCT Application No. PCT/IB2019/PCT/IB2019/053352, consisting of 15 pages.
(Continued)

*Primary Examiner* — Teshome Hailu
(74) *Attorney, Agent, or Firm* — Christopher & Weisberg, P.A.

(57) ABSTRACT

A method, computing device and system are disclosed for evaluating security of virtual infrastructures of tenants in a cloud environment. At least one security metric may be calculated for virtual infrastructures of a tenant based on information associated with at least one virtual resource of the first tenant and at least one interaction of the at least one virtual resource of the first tenant with at least one virtual resource of at least one other tenant in a multi-tenant virtualized infrastructure. At least one security parameter may be evaluated for the first tenant based at least in part on at least one of the at least one calculated security metric for monitoring a security level of the first tenant relative to the at least one other tenant in the multi-tenant virtualized infrastructure.

20 Claims, 9 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 2006/0288420 | A1* | 12/2006 | Mantripragada | G06F 21/51 726/25 |
| 2013/0247205 | A1* | 9/2013 | Schrecker | G06F 21/577 726/25 |
| 2015/0215332 | A1* | 7/2015 | Curcic | H04L 63/20 726/25 |
| 2016/0034293 | A1* | 2/2016 | Cao | G06F 9/5083 718/1 |
| 2017/0193239 | A1 | 7/2017 | Chari et al. | |
| 2018/0020023 | A1* | 1/2018 | Doron | H04L 63/14 |
| 2018/0123864 | A1* | 5/2018 | Tucker | H04L 41/065 |

OTHER PUBLICATIONS

International Preliminary Report on Patentability dated Nov. 5, 2020 issued in PCT Application No. PCT/IB2019/PCT/IB2019/053352, consisting of 9 pages.

Yi Han et al., Using Virtual Machine Allocation Policies to Defend Against Co-Resident Attacks in Cloud Computing; IEEE Transactions on Dependable and Secure Computing, vol. 14, No. 1; May 4, 2015, consisting of 14 pages.

Ristenpart et al., Hey, You, Get Off of My Cloud: Exploring Information Leakage in Third-Party Compute Clouds; Chicago, IL; Nov. 9-13, 2009; consisting of 14 pages.

Wu et al., Whispers in the Hyper-space:High-speed Covert Channel Attacks in the Cloud; Published in USENIX Security Symposium 2012; Aug. 8-10, 2012; consisting of 15 pages.

Liu, A New Form of DOS Attack in a Cloud and Its Avoidance Mechanism; Chicago, IL; Oct. 8, 2010; consisting of 11 pages.

Bleikertz et al., Automated Information Flow Analysis of Virtualized Infrastructures; vol. 6879; 2011; consisting of 20 pages.

Luna et al., Quantitative Assessment of Cloud Security Level Agreements: A Case Study; 2012; consisting of 10 pages.

Xu et al., Power Attack: An Increasing Threat to Data Centers; San Diego, CA; Feb. 23-26, 2014; consisting of 15 pages.

Manadhata et al., An Attack Surface Metric; IEEE Transactions on Software Engineering; vol. 37. No.3; May/Jun. 2011; consisting of 16 pages.

Iceland et al., Racial and Ethnic Residential Segregation in the United States: 1980-2000; Census 2000 Special Reports; Aug. 2002; consisting of 151 pages.

Peng et al., A Moving-Target Defense Strategy for Cloud-based Services with Heterogeneous and Dynamic Attack Surfaces; IEEE International Conference on Communications (ICC); Aug. 28, 2014; consisting of 5 pages.

* cited by examiner

APPARATUS AND METHOD FOR EVALUATING MULTIPLE ASPECTS OF THE SECURITY FOR VIRTUALIZED INFRASTRUCTURE IN A CLOUD ENVIRONMENT

CROSS-REFERENCE TO RELATED APPLICATIONS

This application is a Submission Under 35 U.S.C. § 371 for U.S. National Stage Patent Application of International Application No.: PCT/IB2019/053352, filed Apr. 23, 2019 entitled "APPARATUS AND METHOD FOR EVALUATING MULTIPLE ASPECTS OF THE SECURITY FOR VIRTUALIZED INFRASTRUCTURE IN A CLOUD ENVIRONMENT," which claims priority to U.S. Provisional Application No.: 62/661410, filed Apr. 23, 2018, entitled "APPARATUS AND METHOD FOR EVALUATING MULTIPLE ASPECTS OF THE SECURITY FOR VIRTUALIZED INFRASTRUCTURE IN A CLOUD ENVIRONMENT," the entireties of both of which are incorporated herein by reference.

TECHNICAL FIELD

The present disclosure relates to security in a cloud environment, and in particular, to methods and apparatuses for evaluating one or more aspects of the security for virtualized infrastructure in the cloud environment.

BACKGROUND

Multi-tenancy and shared resources are fundamental characteristics of cloud computing. However, co-residency threats, and more generally proximity-related security threats, in multi-tenant clouds constitute major security concerns and are still holding back the wide adoption of cloud technology.

There are several works on security attacks and risks related to virtual machine (VM) co-residency and, in particular, in the same hypervisor. Possible attacks have been described in works, for example, cross-VM side-channel attacks and covert channel attacks, which can include, for example, extracting information from a target VM on the same physical machine; Denial-of-Service (DoS) attacks, which can include exploiting the network in a cloud environment; and flow analysis, which can include extracting information from flows.

Few works propose quantitative metrics and quantitative assessment frameworks to evaluate security-related Service Level Agreements (SLAs) (or SecLAs). However, such works do not relate to quantitative evaluation of proximity of virtual applications in the cloud. For instance, Luna et al. (in "Quantitative assessment of cloud security level agreements: A case study, "*Proc. of Security and Cryptography*, pp. 64-73, 2012) has contemplated a set of metrics to quantitatively compare, benchmark and evaluate the compliance of cloud service providers' (CSPs') reference SecSLAs.

In the context of co-residency in the cloud, four metrics have been considered (see e.g., Y. Han, J. Chan, T. Alpcan, and C. Leckie, "Using virtual machine allocation policies to defend against co-resident attacks in cloud computing," *IEEE Transactions on Dependable and Secure Computing* (TDSC), 14, no. 1 pp. 95-108, 2017). These four metrics can be divided into two general categories: metrics from the attackers' point of view (efficiency metric and $VM_{min}$ metric), and metrics from the tenants' point of view (coverage metric and average number of tenants per host metric). Such metrics may be applied to evaluate the effectiveness of virtual machines' placement algorithms against co-residency attacks. However, existing metrics are lacking.

SUMMARY

As discussed above, while some works have focused on demonstrating security problems related to tenants' virtual resource proximity, none of them have proposed a mechanism to quantitatively measure the security posture of different virtual applications in the cloud.

Further, while some works have presented frameworks for prospective cloud customers to choose the right CSP based on the advocated SecLAs, such works do not propose any security metric to quantify proximity of a tenant virtual application in the cloud with respect to others.

The conventional metrics from the tenants' point of view are insufficient in modeling the proximity between different virtual infrastructures deployed inside a complex cloud environment. More precisely, the conventional coverage metric only focuses on host-level measurements; the information related to the virtual network is ignored. Furthermore, such conventional metric, generally defined as the average number of tenants per host, is computed for the whole datacenter and is not tenant-oriented. Therefore, it is impossible to use this as a direct input to quantify the security posture between virtual infrastructures of different tenants.

The concept of attack surface was originally proposed for specific software and requires domain-specific expertise to formulate and implement. However, existing systems do not apply an attack surface concept to evaluate the security level in a multi-tenancy environment such as Software-defined networking (SDN)-based clouds.

Some embodiments discussed herein provide techniques for evaluating security of the tenants' virtual infrastructures against e.g., multi-tenancy threats, such as side channel attack, power attack etc., at different levels of cloud infrastructures. Some embodiments provide techniques for calculating network level and compute level measurement for virtual infrastructures.

Some embodiments advantageously provide methods and apparatuses for evaluating the impact of proximity-related security threats in multi-tenant clouds. Some embodiments include measuring the security posture for tenants in the cloud using novel security metrics, which may include at least the three building blocks of metrics discussed herein. In some embodiments, the novel metrics, which may be considered the building blocks for evaluating security for cloud tenants according to this disclosure, may be referred to generally a host sharing metrics, coverage metrics and/or abundance metrics. It should be understood that, in other embodiments, such metrics may be referred to using different terminology, but generally corresponding to definitions of such metrics described herein. In some embodiments, such metrics may be used to output certain security measurements provided by the disclosure and which may be useful for cloud tenants.

Some embodiments may include a security evaluation system, apparatus and/or method, which combines a set of virtual network-level as well as compute-level measurements for virtual infrastructures in order to quantitatively evaluate the security level of tenants' deployments in an SDN-based cloud. Some embodiments provide for a system, apparatus and/or method that quantitatively evaluates the proximity between different virtual infrastructure deployments based on an inventive maximum proximity technique, which, in some embodiments, aggregates one or more novel metrics (e.g., coverage metric) that may be defined at network and/or compute levels (e.g., virtual machine (VM) and flow coverage metrics). Some embodiments of the disclosure provide a system, apparatus and/or method that quantitatively evaluates the potential attackability risk between different virtual infrastructure deployments based on a newly defined multi-tenancy attack surface method/technique, which, in some embodiments, aggregates new metrics (e.g., host sharing and coverage metrics) defined at network and compute levels. In some embodiments, the multi-tenancy attack surface method may evaluate an aspect of security using the VM coverage, flow coverage, and/or normalized host sharing metrics disclosed herein. According to some embodiments, a system, apparatus and/or method is provided that quantitatively evaluates the potential maximum damage per tenant virtual infrastructure deployment based on a newly defined maximum exposure technique, which, in some embodiments, aggregates new metrics defined at network and compute levels as described in the present disclosure. In some embodiments, such maximum exposure technique may utilize the following metrics: VM coverage and VM abundance and sometimes flow coverage and flow abundance metrics, as well.

According to a first aspect of the present disclosure, a computing device for evaluating security for virtualized infrastructures of tenants in a cloud environment is provided. The computing device comprises processing circuitry including instructions executable by the processing circuitry to configure the computing device to calculate at least one security metric for a first tenant based at least in part on information associated with at least one virtual resource of the first tenant and at least one interaction of the at least one virtual resource of the first tenant with at least one virtual resource of at least one other tenant in a multi-tenant virtualized infrastructure; and evaluate at least one security parameter for the first tenant based at least in part on at least one of the at least one calculated security metric for monitoring a security level of the first tenant relative to the at least one other tenant in the multi-tenant virtualized infrastructure.

In some embodiments of the first aspect, each of the at least one virtual resource of the first tenant and the at least one virtual resource of the at least one other tenant includes at least one of a compute resource and a network resource. In some embodiments of the first aspect, the at least one interaction of the at least one virtual resource of the first tenant with the at least one virtual resource of the at least one other tenant includes at least one interaction between the at least one of the compute resource and the network resource of the first tenant and the at least one of the compute resource and the network resource of the at least one other tenant. In some embodiments of the first aspect, the processing circuitry includes further instructions executable by the processing circuitry to configure the computing device to obtain at least one weight, the at least one weight based at least in part on at least one vulnerability score of at least one known vulnerability associated with the at least one virtual resource of the first tenant. In some embodiments of the first aspect, the processing circuitry includes further instructions executable by the processing circuitry to configure the computing device to evaluate the at least one security parameter using the obtained at least one weight. In some embodiments of the first aspect, the processing circuitry includes further instructions executable by the processing circuitry to con-figure the computing device to dynamically update the at least one weight based on information from an exploitation database.

In some embodiments of the first aspect, the at least one security metric includes at least one of a normalized host sharing metric, a coverage metric and an abundance metric. In some embodiments of the first aspect, the normalized host sharing metric is based on a number of other tenants that are co-located within a host of the at least one virtual resource of the first tenant; the coverage metric is based on a ratio of virtual resources of the first tenant on a host in which there are other virtual resources of the at least one other tenant to a total number of virtual resources of the first tenant in the multi-tenant virtualized infrastructure; and the abundance metric is based on a number of virtual resources of the first tenant on a host divided by a total number of virtual resources on the host.

In some embodiments of the first aspect, the processing circuitry includes further instructions executable by the processing circuitry to configure the computing device to calculate the at least one security metric for the first tenant by calculating a normalized host sharing metric according to $$\frac{T_{h,A} - 1}{T - 1},$$

where $T_{h,A}$ is a total number of other tenants that are co-located within a host h of the at least one virtual resource of the first tenant A and T is a total number of tenants in the multi-tenant virtualized infrastructure. In some embodiments of the first aspect, the processing circuitry includes further instructions executable by the processing circuitry to configure the computing device to calculate the at least one security metric for the first tenant by calculating a coverage metric, the coverage metric including at least one of a host-level virtual machine coverage metric and a host-level flow coverage metric, the host-level virtual machine coverage metric being calculated as a ratio of virtual machines belonging to the first tenant A located at the host h within which there is at least one other virtual machine belonging to the at least one other tenant B to a total number of virtual machines belonging to the first tenant A in the multi-tenant virtualized infrastructure and the host-level flow coverage metric with respect to the first tenant A and the host h being calculated as a ratio of flow rules that match to the virtual machines of the first tenant A located at the host h to a total number of flows corresponding to all the virtual machines of the first tenant A in the multi-tenant virtualized infrastructure, where h is common to the first tenant A and the at least one other tenant B.

In some embodiments of the first aspect, the processing circuitry includes further instructions executable by the processing circuitry to configure the computing device to calculate the at least one security metric for the first tenant by calculating an abundance metric, the abundance metric including at least one of a host-level virtual machine abundance metric and a host-level flow abundance metric, the host-level virtual machine abundance metric being calculated according to a number of virtual machines of the at least one other tenant B on a host h divided by a total number of virtual machines on the host h and the host-level flow abundance metric being calculated according to a number of flow rules of the virtual machines of the at least one other tenant B on the host h divided by a total number of flow rules on the host h.

In some embodiments of the first aspect, the at least one security parameter includes at least one of a maximum proximity, a multi-tenancy attack surface, and a maximum exposure. In some embodiments of the first aspect, the processing circuitry includes further instructions executable by the processing circuitry to configure the computing device to evaluate the at least one security parameter for the first tenant by evaluating a maximum proximity for the first tenant, the maximum proximity representing a maximum coverage metric for the first tenant relative to the at least one other tenant. In some embodiments of the first aspect, the processing circuitry includes further instructions executable by the processing circuitry to configure the computing device to evaluate the at least one security parameter for the first tenant by evaluating a multi-tenancy attack surface for the first tenant, the multi-tenancy attack surface representing a set of virtual resources belonging to the first tenant on a host that can be attacked. In some embodiments of the first aspect, the processing circuitry includes further instructions executable by the processing circuitry to configure the computing device to evaluate the at least one security parameter for the first tenant by evaluating a maximum exposure for the first tenant, the maximum exposure representing an exposure of the first tenant in a zone shared with the at least one other tenant.

In some embodiments of the first aspect, the multi-tenancy attack surface is evaluated for the first tenant by multiplying a coverage metric and a normalized host sharing metric defined for the host. In some embodiments of the first aspect, the maximum exposure is evaluated for the first tenant by multiplying a coverage metric and an abundance metric defined for a host. In some embodiments of the first aspect, the processing circuitry includes further instructions executable by the processing circuitry to configure the computing device to determine a multi-tenancy attack surface value for the first tenant for each host in the multi-tenant virtualized infrastructure; and calculate a total multi-tenancy attack surface value for the first tenant as a sum of the multi-tenancy attack surface values for the first tenant for each host multiplied by a severity weight. In some embodiments of the first aspect, the processing circuitry includes further instructions executable by the processing circuitry to configure the computing device to calculate the total multi-tenancy attack surface value as at least a two-dimensional attack surface value including a compute-level attack surface value and a network-level attack surface value for the first tenant. In some embodiments of the first aspect, the processing circuitry includes further instructions executable by the processing circuitry to configure the computing device to determine a maximum exposure value for the first tenant for each host in the multi-tenant virtualized infrastructure on which there is at least one of the at least one virtual resource of the first tenant; and calculate an overall maximum exposure value for the first tenant by combining each determined maximum exposure value.

According to a second aspect of the present disclosure, a method implemented by a computing device for evaluating security for virtualized infrastructures of tenants in a cloud environment is provided. The method comprising calculating at least one security metric for a first tenant based at least in part on information associated with at least one virtual resource of the first tenant and at least one interaction of the at least one virtual resource of the first tenant with at least one virtual resource of at least one other tenant in a multi-tenant virtualized infrastructure; and evaluating at least one security parameter for the first tenant based at least in part on at least one of the at least one calculated security metric for monitoring a security level of the first tenant relative to the at least one other tenant in the multi-tenant virtualized infrastructure.

In some embodiments of the second aspect, each of the at least one virtual resource of the first tenant and the at least one virtual resource of the at least one other tenant includes at least one of a compute resource and a network resource. In some embodiments of the second aspect, the at least one interaction of the at least one virtual resource of the first tenant with the at least one virtual resource of the at least one other tenant includes at least one interaction between the at least one of the compute resource and the network resource of the first tenant and the at least one of the compute resource and the network resource of the at least one other tenant. In some embodiments of the second aspect, the method further comprises obtaining at least one weight, the at least one weight based at least in part on at least one vulnerability score of at least one known vulnerability associated with the at least one virtual resource of the first tenant. In some embodiments of the second aspect, the evaluating the at least one security parameter further comprises evaluating the at least one security parameter using the obtained at least one weight.

In some embodiments of the second aspect, the method further comprises dynamically updating the at least one weight based on information from an exploitation database. In some embodiments of the second aspect, the at least one security metric includes at least one of a normalized host sharing metric, a coverage metric and an abundance metric. In some embodiments of the second aspect, the normalized host sharing metric is based on a number of other tenants that are co-located within a host of the at least one virtual resource of the first tenant; the coverage metric is based on a ratio of virtual resources of the first tenant on a host in which there are other virtual resources of the at least one other tenant to a total number of virtual resources of the first tenant in the multi-tenant virtualized infrastructure; and the abundance metric is based on a number of virtual resources of the first tenant on a host divided by a total number of virtual resources on the host.

In some embodiments of the second aspect, the calculating the at least one security metric for the first tenant further comprises calculating a normalized host sharing metric according to $$\frac{T_{h,A} - 1}{T - 1},$$

where $T_{h,A}$ is a total number of other tenants that are co-located within a host h of the at least one virtual resource of the first tenant A and T is a total number of tenants in the multi-tenant virtualized infrastructure. In some embodiments of the second aspect, the calculating the at least one security metric for the first tenant further comprises calculating a coverage metric, the coverage metric including at least one of a host-level virtual machine coverage metric and a host-level flow coverage metric, the host-level virtual machine coverage metric being calculated as a ratio of virtual machines belonging to the first tenant A located at the host h within which there is at least one other virtual machine belonging to the at least one other tenant B to a total number of virtual machines belonging to the first tenant A in the multi-tenant virtualized infrastructure and the host-level flow coverage metric with respect to the first tenant A and the host h being calculated as a ratio of flow rules that match to the virtual machines of the first tenant A located at the host h to a total number of flows corresponding to all the virtual machines of the first tenant A in the multi-tenant virtualized infrastructure, where h is common to the first tenant A and the at least one other tenant B.

In some embodiments of the second aspect, the calculating the at least one security metric for the first tenant further comprises calculating an abundance metric, the abundance metric including at least one of a host-level virtual machine abundance metric and a host-level flow abundance metric, the host-level virtual machine abundance metric being calculated according to a number of virtual machines of the at least one other tenant B on a host h divided by a total number of virtual machines on the host h and the host-level flow abundance metric being calculated according to a number of flow rules of the virtual machines of the at least one other tenant B on the host h divided by a total number of flow rules on the host h. In some embodiments of the second aspect, the evaluating the at least one security parameter for the first tenant further comprises evaluating at least one of a maximum proximity, a multi-tenancy attack surface, and a maximum exposure. In some embodiments of the second aspect, the evaluating the at least one security parameter for the first tenant further comprises evaluating a maximum proximity for the first tenant, the maximum proximity representing a maximum coverage metric for the first tenant relative to the at least one other tenant.

In some embodiments of the second aspect, the evaluating the at least one security parameter for the first tenant further comprises evaluating a multi-tenancy attack surface for the first tenant, the multi-tenancy attack surface representing a set of virtual resources belonging to the first tenant on a host that can be attacked. In some embodiments of the second aspect, the evaluating the at least one security parameter for the first tenant further comprises evaluating a maximum exposure for the first tenant, the maximum exposure representing an exposure of the first tenant in a zone shared with the at least one other tenant. In some embodiments of the second aspect, the evaluating the multi-tenancy attack surface for the first tenant further comprises multiplying a coverage metric and a normalized host sharing metric defined for the host. In some embodiments of the second aspect, the evaluating the maximum exposure for the first tenant further comprises multiplying a coverage metric and an abundance metric defined for a host. In some embodiments of the second aspect, the method further comprises determining a multi-tenancy attack surface value for the first tenant for each host in the multi-tenant virtualized infrastructure; and calculating a total multi-tenancy attack surface value for the first tenant as a sum of the multi-tenancy attack surface values for the first tenant for each host multiplied by a severity weight.

In some embodiments of the second aspect, the calculating the total multi-tenancy attack surface value further comprises calculating the total multi-tenancy attack surface value as at least a two-dimensional attack surface value including a compute-level attack surface value and a network-level attack surface value for the first tenant. In some embodiments of the second aspect, the method further comprises determining a maximum exposure value for the first tenant for each host in the multi-tenant virtualized infrastructure on which there is at least one of the at least one virtual resource of the first tenant; and calculating an overall maximum exposure value for the first tenant by combining each determined maximum exposure value.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
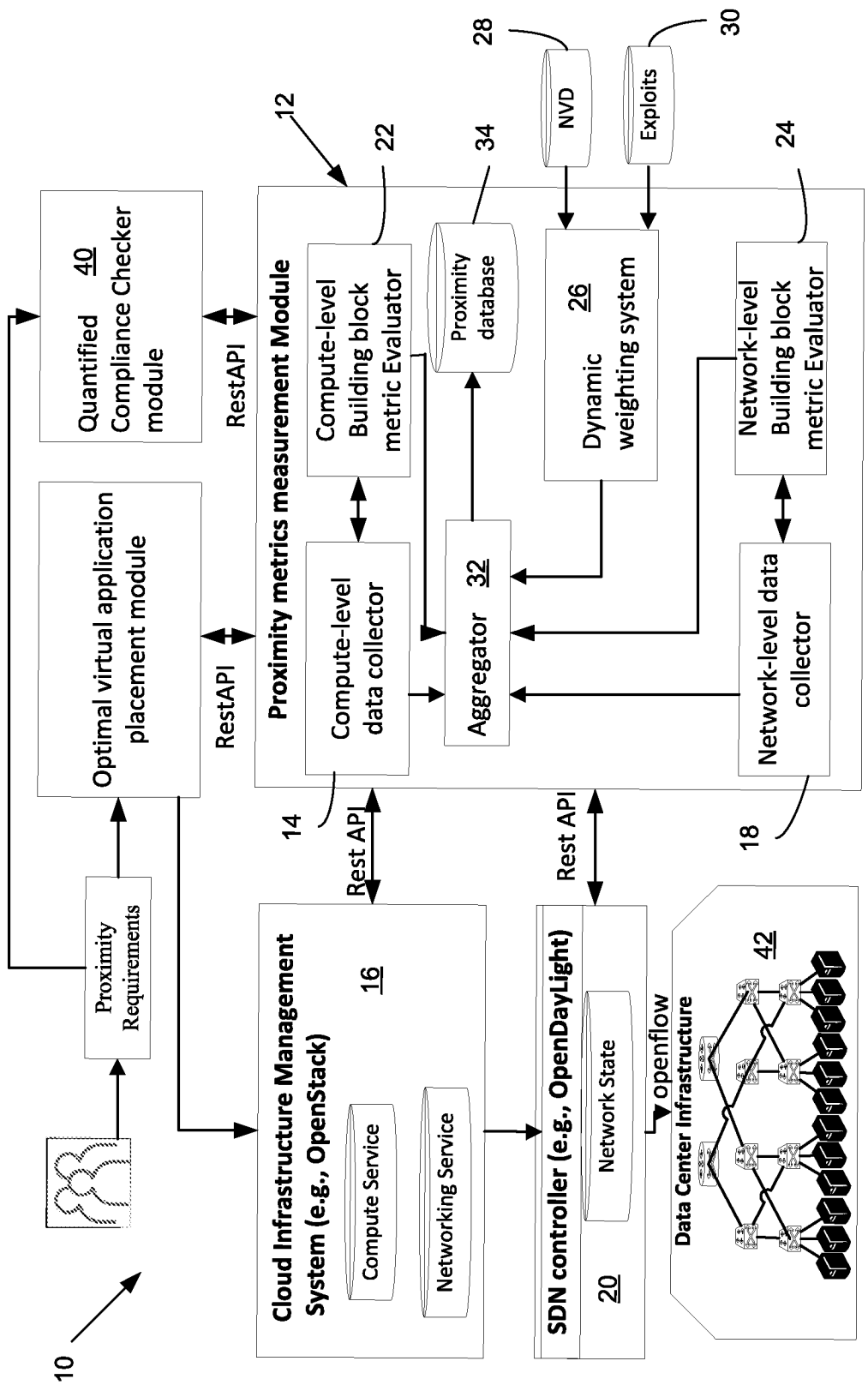
FIG. 1 is a schematic diagram illustrating an exemplary architecture and integration of a computing device for measuring tenant security into a multi-tenant SDN-based cloud environment according to the principles in the present disclosure.

Before describing in detail exemplary embodiments, it is noted that the embodiments reside primarily in combinations of apparatus components and processing steps related to apparatuses and methods for evaluating one or more aspects of the security of a virtualized infrastructure in a cloud environment. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Note that although terminology from one particular networking environment, such as, for example, software-defined networking (SDN) and cloud computing, may be used in this disclosure, this should not be seen as limiting the scope of the disclosure to only the aforementioned technologies. Other communication systems and networks may also benefit from exploiting the ideas covered within this disclosure.

In some embodiments, the term "computing device" is used and may indicate a single device or may be used to indicate more than one physical device connected together to implement one or more of the methods, functions, and techniques described herein.

Note further, that functions, methods, apparatuses, systems and techniques described herein may be performed by a single device, in some embodiments, and/or may be distributed over a plurality of devices and/or network nodes, in other embodiments. In other words, it is contemplated that the functions, methods, apparatuses, systems and techniques described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

According to some embodiments of the disclosure, apparatuses and methods are provided for determining the security level of virtual applications deployed in a multi-tenant SDN-based cloud based on a novel set of metrics. In some embodiments, degrees of proximity among virtual applications are used as the measurement of security and the security level of virtual applications are audited in the cloud environment. In further embodiments, if the security level of the requested virtual applications is found to be inferior to some threshold value (e.g., the security level defined in an agreement/contract signed by both parties, e.g., a provider and a tenant), a warning message and/or alarm may be sent or triggered indicating a possible security breach to the cloud management system to request a further action associated with the affected virtual application(s). In one embodiment, a security metric requester (e.g., a cloud tenant) is provided that is also able to continuously monitor the security level of the virtual applications based on continuous auditing reports generated by the system. More specifically, in some embodiments, one or all of at least three building block security metrics may be combined together for security level evaluations. These security level evaluations may be referred to herein as maximum proximity, multi-tenancy attack surface, and maximum exposure. It should be understood that these security evaluations may be referred to using different terminology as well, but generally corresponding to the definitions described herein.

In other words, the disclosure is not intended to be limited in any way to the names of the novel security approaches used herein.

In one embodiment, maximum proximity includes computing the proximity between different virtual infrastructure deployments. Independent of the potential attackers, this technique may include measuring the proximity of a given tenant deployment with respect to all other tenants. In some aspects, this method can be thought as a maximum risk-level (or lowest security level) for a given tenant relative to other tenants.

In one embodiment, multi-tenancy attack surface provides a multi-dimension (e.g., two dimensional) attackability measurement that may be calculated based on the potential resources that would be used by a potential malicious tenant to perform an attack. This technique may provide an overview of the security level of a tenant.

In one embodiment, the maximum exposure technique includes evaluating the potential maximum damage per tenant virtual infrastructure deployment. Similar to the maximum proximity technique, the maximum exposure technique may reveal the maximum risk level in terms of abundance of virtual resources.

All or some of these methods can be used to evaluate the security level from multiple abstraction levels: compute-level and network-level. These techniques may be integrated into an SDN-based cloud system composed of a cloud infrastructure management system and an SDN controller. Some of the advantages of the techniques provided by the disclosure include one or more of the following:

Defining and enabling a quantification of the proximity between virtual resources along with their generated network flows, possibly belonging to tenants with different trust levels, at different granularity levels (e.g., a set of VMs belonging to the same tenant, the same application, the same application tier, etc.).
  Provide tenants with tool(s) to express their co-residency and proximity requirements in terms of thresholds expressing the tolerated/accepted level of proximity depending on the sensitivity of their assets and their tolerated security risks.
  Provide Cloud providers and tenants with a quantified auditing system promoting more transparency in terms of proximity, which would increase tenants' trust in the CSPs and security awareness.
  Enable evaluation of security postures of cloud deployments and the comparison between different deployment choices from a security perspective. This could advantageously enable CSPs to perform security-aware virtual applications placement to optimize compute-level and network-level distances between mutually distrusted consumers/tenants.

Referring to the drawing figures, in which like elements are referred to by like reference numerals, there is shown in FIG. 1 a schematic diagram of a communication system 10, representing one example of architecture a system integrated into a multi-tenant SDN-based cloud environment. Communication system 10 may support a number of use cases including but not limited to: Quantified compliance checking and Optimal placement. FIG. 1 presents an example computing device 12 that can be used to measure the security level of tenants' virtual infrastructures based on compute-level and network-level building block metrics according to any of the techniques in the present disclosure.

The example computing device 12 includes at least the following elements, which may, in some embodiments, be software, computing hardware, and/or a combination of software implemented by the computing hardware:

1—Compute-level data collector 14. In one embodiment, the computer-level data collector 14 connects to the cloud infrastructure management system 16 in order to collect compute-related information including information related to the servers and the location of the VMs in the servers based on their associated virtual applications.

2—Network-level data collector 18. In one embodiment, the network-level data collector 18 connects to the cloud infrastructure management system 16 and the SDN controller 20 to collect the information that can be used to perform network-level building block metrics, e.g., network flow size. The cloud infrastructure management system 16 may assist in relating the virtual application networks to their unique identifier, which can allow e.g., the computing device 12 to identify the associated rules per switch for each virtual application. As an example, in a cloud managed by Openstack and Opendaylight, virtual networks' segmentation IDs (or flow-IDs) may be collected from a table of networks in Neutron, and the routing rules from the table routers. The OpenDaylight database may be relied on to collect the OpenFlow rules installed in physical and virtual switches associated to sets of VMs or to applications connecting networks.

3—Compute-level building block metrics evaluator 22. In one embodiment, the compute-level building block metrics evaluator 22 evaluates metrics related to compute resources (e.g., VM coverage). Example functionality is described in more detail herein below.

4—Network-level building block metrics evaluator 24. In one embodiment, the network-level building block metrics evaluator 24 evaluates metrics related to virtual network resources (e.g., flow coverage). Example functionality is described in more detail herein below.

5—Dynamic weighting system 26. In one embodiment, the dynamic weighting system 26 may receive inputs from one or more databases, such as, for example, both the Natural Vulnerability Database (NVD)[1] 28 and Exploits[2] databases 30 and may map the joint vulnerabilities. The dynamic weighting system 26 may then search a Common Vulnerability Scoring System (CVSS) base source for the joint vulnerabilities. The average of the joint vulnerabilities CVSS base scores may be calculated as the weight for an aggregator 32 (e.g., an Aggregator).

[1] https://nvd.nist.gov/
[2] https://www.exploit-db.com/

6—Aggregator 32. The Aggregator 32 may obtain as inputs the building block metrics (e.g., from metrics Evaluators 22 and 24) and the dynamic weighting system 26 output, as shown in FIG. 1, and may then aggregate such data to obtain the three parameters/measurements/metrics disclosed herein, namely the maximum proximity, multi-tenancy attack surface and maximum exposure. Examples of the implemented functionalities are described below with reference to FIG. 4. The Aggregator 32 may also coordinate the data collection and measurements and can be used to trigger the time instant for measuring the security level and storing them in a Proximity database 34. The Aggregator 32 can also implement the REST-API that can be used to query these measurements by different modules or devices either offline or online. This REST API can be used by different modules or devices depending on the use case, such as, for example, the use cases of quantified compliance verification and optimal placement of virtual applications based on the proximity metrics.

7—Proximity database 34. The proximity database 34 may store different measurements performed by the computing device 12 at different time instants.

Each of the elements described above, and, in some embodiments in particular, the compute-level building block metrics evaluator 22, the network-level building blocks metrics evaluator 24, and the Aggregator 32 may be considered to implement some of novel and/or inventive techniques described in the disclosure (e.g., such as those described with reference to FIGS. 2 and 3).

Use Case Example: Quantified Compliance Checker 40

To increase trust between provider and tenants, there is proposed a security measurement feature that may be implemented by the computing device 12. The computing device 12 may use a new set of metrics and methods to measure and audit security levels in a multi-tenant cloud environment. With the system, tenants can specify thresholds for these security metrics to specify the tolerant low-boundary security levels of their virtual applications to other tenants' virtual applications. This may be accomplished depending on several factors including the characteristics of their own applications (e.g., workload sensitivity and communication patterns), the security levels of different tiers of the same application, and/or the trust-relationship with respect to other potential tenants sharing the same cloud infrastructure 42. Stated another way, for example, a first tenant may share the same physical infrastructure in the cloud environment 42 with at least one other (e.g., untrusted) tenant, which may be considered a source of vulnerability in such multi-tenant virtualized infrastructure 42.

In counterpart, the cloud providers can deploy the computing device 12 to measure the security level of different tenants' virtual infrastructures based on the data collected from the SDN-based cloud infrastructure 42 and can monitor quantitatively the compliance of the tenants' virtual applications with respect to their security requirements.

The computing device 12 may evaluate multiple aspects of security level from both compute-level and network-level perspectives using one or more of the three methods discussed in the disclosure that are aggregated, e.g., via aggregator 32, from the three building block metrics. The maximum proximity from other tenants reveals the upper bound risk for a tenant; multi-tenancy attack surface illustrates the potential attackability risk, which is the likelihood of potential attacks, at both compute and network levels; and maximum exposure demonstrates the maximum damages that a tenant might face. Compliance may be checked by comparing the determined security level with the specified thresholds.

If the security levels are determined to be lower than the predetermined thresholds, the deviation values can be provided to the tenants to monitor their compliance.

FIG. 1 illustrates how the quantified compliance checker 40 of virtual applications' security level with respect to tenants' requirements can be deployed using the proposed computing device 12 in an SDN-based cloud.

Notation

Before describing in more detailed the building block metrics included in computing device 12, some of the notation symbols and their descriptions are shown below in Table 1.

TABLE 1

Notations symbols and their descriptions

| Notations | Descriptions |
|---|---|
| h | A host |
| $h_A$, $h_B$ | The set of hosts containing at least one VM from tenant A and from tenant B, respectively |
| $T_{h, A}$ | The total number of tenants in host h, which have at least one VM collocated with tenant A's VM |
| T | The total number of tenants in a datacenter |
| $Z_{h, A}$ | The set of hosts in zone z containing at least one VM from a given tenant A |
| $T_{Z_{h, A}}$ | The total number of tenants in hosts $Z_{h, A}$ |
| $D_{h, A}$ | The set of hosts in a data center D, containing at least one VM from a given tenant |
| $T_{D_{h, A}}$ | The total number of tenants in hosts $D_{h, A}$ |
| VM_A, VM_B, VM_C, VM_D | Total numbers of VMs in the virtual application A, B, C, and D, respectively |
| $h_i$ | The $i^{th}$ host |
| $vm_{A, h}$, $vm_{A, z_{h, A}}$, $vm_{A, D_{h, A}}$ | The number of VMs from tenant A in hosts h, $Z_{h, A}$, and $D_{h, A}$, respectively |
| $vm_{A, h}$, $vm_{A, z_{h, B}}$, $vm_{A, D_{h, B}}$ | The number of VMs from tenant B in hosts h, $Z_{h, B}$, and $D_{h, B}$, respectively |
| $VM_A$ | The total number of VMs in the data center from tenant A |
| flowsize(A, h), flowsize(A, $z_{h, A}$), flowsize(A, $D_{h, A}$) | The number of network flow rules of the VMs from tenant B, located in hosts h, $Z_{h, A}$, and $D_{h, A}$ respectively |
| flowsize(B, h), flowsize(B, $z_{h, B}$), flowsize(B, $D_{h, B}$) | The number of flow rules matches the VMs on host h, $Z_{h, B}$, and $D_{h, B}$ from tenant B |
| flowsize(A), flowsize(B) | The total number of flow rules corresponding to all VMs from tenant A or tenant B, respectively |
| $VM_h$, $VM_Z$, $VM_D$ | The total number of VMs on host h, zone Z and data center D |
| t | A tenant |
| $T_c(A)$ | The set of tenants collocated with tenant A on at least one host |
| $w_i$ | Weight generated from dynamic weighting system |
| VI A | Virtual Infrastructure of tenant A |
| svi | Subset of the virtual infrastructure |
| Tr | Trust weight assigned by a given tenant based on group of tenants |

Example methods and techniques that may be used by such computing device 12 to measure tenant security will be explained in more detail below with reference to FIGS. 3-9. In addition, some embodiments of the hardware of such computing device 12, used to implement one or more of the methods and techniques herein, will be described in more detail below with reference to FIG. 2.

Figure 2:
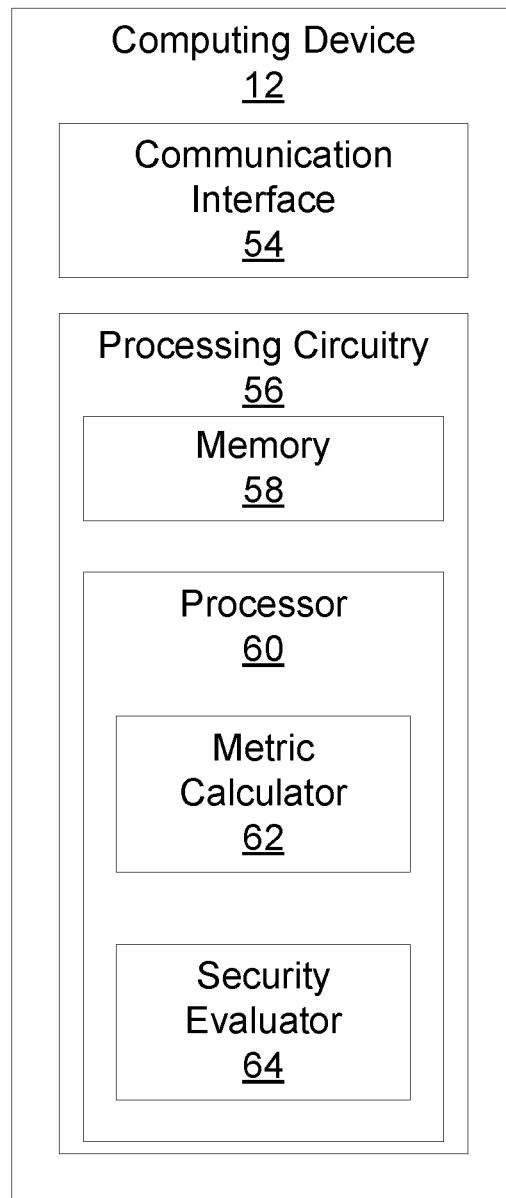
FIG. 2 is a block diagram of an exemplary computing device according to some embodiments of the present disclosure.

FIG. 2 illustrates an exemplary computing device 12 for evaluating security for virtual infrastructures of tenants in a cloud environment. The computing device 12 includes a communication interface 54, processing circuitry 56, and memory 58.

The communication interface 54 may be configured to communicate with the cloud infrastructure management system 16 SDN controller 20 and/or other elements in the system 10. In some embodiments, the communication interface 54 may be formed as or may include, for example, one or more radio frequency (RF) transmitters, one or more RF receivers, and/or one or more RF transceivers, and/or may be considered a radio interface. In some embodiments, the communication interface 54 may include a wired and/or a wireless interface. In one embodiment, the communication interface 54 may include or be associated with a network interface element, such as, for example, network interface card.

The processing circuitry 56 may include one or more processors 60 and memory, such as, the memory 58. In particular, in addition to a traditional processor and memory, the processing circuitry 56 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 60 and/or the processing circuitry 56 may be configured to access (e.g., write to and/or read from) the memory 58, which may comprise any kind of volatile and/or nonvolatile memory, e.g., cache and/or buffer memory and/ or RAM (Random Access Memory) and/or ROM (Read-Only Memory) and/or optical memory and/or EPROM (Erasable Programmable Read-Only Memory).

Thus, the computing device 12 may further include software stored internally in, for example, memory 58, or stored in external memory (e.g., database) accessible by the computing device 12 via an external connection. The software may be executable by the processing circuitry 56. The processing circuitry 56 may be configured to control any of the methods and/or processes described herein and/or to cause such methods, and/or processes to be performed, e.g., by the computing device 12, such as the methods, modules, functions and techniques described herein with reference to FIGS. 1-9. The memory 58 is configured to store data, programmatic software code and/or other information described herein. In some embodiments, the software may include instructions that, when executed by the processor 60 and/or processing circuitry 56, causes the processor 60 and/or processing circuitry 56 to perform the processes described herein with respect to the computing device 12. In some embodiments, the processor 60 may include a metric calculator 62 and a security evaluator 64. In some embodiments, the metric calculator 62 and/or the methods performed via the metric calculator 62 may be implemented in and/or by one or more of the compute-level building block metric evaluator 22 and/or the network-level building block metric evaluator 24, discussed with reference to FIG. 1. In some embodiments, the security evaluator 64 and/or the methods performed via the security evaluator 64 may be implemented in and/or by the aggregator 32, discussed with reference to FIG. 1.

In some embodiments, the metric calculator 62 is configured to calculate at least one security metric for a first tenant based at least in part on information associated with at least one virtual resource of the first tenant and at least one interaction of the at least one virtual resource of the first tenant with at least one virtual resource of at least one other tenant in a multi-tenant virtualized infrastructure. The least one virtual resource (e.g., virtual compute and/or network resource) of the first tenant may be considered to share the same physical infrastructure of the at least one virtual resource of the at least one other tenant. The security evaluator 64 is configured to evaluate at least one security parameter for the first tenant based at least in part on at least one of the at least one calculated security metric for monitoring a security level of the first tenant relative to the at least one other tenant in the multi-tenant virtualized infrastructure.

In some embodiments, each of the at least one virtual resource of the first tenant and the at least one virtual resource of the at least one other tenant includes at least one of a compute resource and a network resource. In some embodiments, the at least one interaction of the at least one virtual resource of the first tenant with the at least one virtual resource of the at least one other tenant includes at least one interaction between the at least one of the compute resource and the network resource of the first tenant and the at least one of the compute resource and the network resource of the at least one other tenant. The interaction may be considered an interaction between virtual compute resources and/or network resources between tenants. In some embodiments, the processing circuitry 56 includes further instructions executable by the processing circuitry 56 to configure the computing device 12 to obtain at least one weight, the at least one weight based at least in part on at least one vulnerability score of at least one known vulnerability associated with the at least one virtual resource of the first tenant. In some embodiments, the processing circuitry 56 includes further instructions executable by the processing circuitry 56 to configure the computing device 12 to evaluate the at least one security parameter using the obtained at least one weight.

In some embodiments, the processing circuitry 56 includes further instructions executable by the processing circuitry 56 to configure the computing device 12 to dynamically update the at least one weight based on information from an exploitation database. In some embodiments, the at least one security metric includes at least one of a normalized host sharing metric, a coverage metric and an abundance metric. In some embodiments, the normalized host sharing metric is based on a number of other tenants that are co-located within a host of the at least one virtual resource of the first tenant; the coverage metric is based on a ratio of virtual resources of the first tenant on a host in which there are other virtual resources of the at least one other tenant to a total number of virtual resources of the first tenant in the multi-tenant virtualized infrastructure; and the abundance metric is based on a number of virtual resources of the first tenant on a host divided by a total number of virtual resources on the host.

In some embodiments, the processing circuitry 56 includes further instructions executable by the processing circuitry 56 to configure the computing device 12 to calculate the at least one security metric for the first tenant by calculating a normalized host sharing metric according to $$\frac{T_{h,A} - 1}{T - 1},$$

where $T_{h,A}$ is a total number of other tenants that are co-located within a host h of the at least one virtual resource of the first tenant A and T is a total number of tenants in the multi-tenant virtualized infrastructure. In some embodiments, the processing circuitry 56 includes further instructions executable by the processing circuitry 56 to configure the computing device 12 to calculate the at least one security metric for the first tenant by calculating a coverage metric, the coverage metric including at least one of a host-level virtual machine coverage metric and a host-level flow coverage metric, the host-level virtual machine coverage metric being calculated as a ratio of virtual machines belonging to the first tenant A located at the host h within which there is at least one other virtual machine belonging to the at least one other tenant B to a total number of virtual machines belonging to the first tenant A in the multi-tenant virtualized infrastructure and the host-level flow coverage metric with respect to the first tenant A and the host h being calculated as a ratio of flow rules that match to the virtual machines of the first tenant A located at the host h to a total number of flows corresponding to all the virtual machines of the first tenant A in the multi-tenant virtualized infrastructure, where h is common to the first tenant A and the at least one other tenant B.

In some embodiments, the processing circuitry 56 includes further instructions executable by the processing circuitry 56 to configure the computing device 12 to calculate the at least one security metric for the first tenant by calculating an abundance metric, the abundance metric including at least one of a host-level virtual machine abundance metric and a host-level flow abundance metric, the host-level virtual machine abundance metric being calculated according to a number of virtual machines of the at least one other tenant B on a host h divided by a total number of virtual machines on the host h and the host-level flow abundance metric being calculated according to a number of flow rules of the virtual machines of the at least one other tenant B on the host h divided by a total number of flow rules on the host h. In some embodiments, the at least one security parameter includes at least one of a maximum proximity, a multi-tenancy attack surface, and a maximum exposure. In some embodiments, the processing circuitry 56 includes further instructions executable by the processing circuitry 56 to configure the computing device 12 to evaluate the at least one security parameter for the first tenant by evaluating a maximum proximity for the first tenant, the maximum proximity representing a maximum coverage metric for the first tenant relative to the at least one other tenant.

In some embodiments, the processing circuitry 56 includes further instructions executable by the processing circuitry 56 to configure the computing device 12 to evaluate the at least one security parameter for the first tenant by evaluating a multi-tenancy attack surface for the first tenant, the multi-tenancy attack surface representing a set of virtual resources belonging to the first tenant on a host that can be attacked. In some embodiments, the processing circuitry 56 includes further instructions executable by the processing circuitry 56 to configure the computing device 12 to evaluate the at least one security parameter for the first tenant by evaluating a maximum exposure for the first tenant, the maximum exposure representing an exposure of the first tenant in a zone shared with the at least one other tenant. In some embodiments, the multi-tenancy attack surface is evaluated for the first tenant by multiplying a coverage metric and a normalized host sharing metric defined for the host. In some embodiments, the maximum exposure is evaluated for the first tenant by multiplying a coverage metric and an abundance metric defined for a host.

In some embodiments, the processing circuitry 56 includes further instructions executable by the processing circuitry 56 to configure the computing device 12 to determine a multi-tenancy attack surface value for the first tenant for each host in the multi-tenant virtualized infrastructure; and calculate a total multi-tenancy attack surface value for the first tenant as a sum of the multi-tenancy attack surface values for the first tenant for each host multiplied by a severity weight. In some embodiments, the processing circuitry 56 includes further instructions executable by the processing circuitry 56 to configure the computing device 12 to calculate the total multi-tenancy attack surface value as at least a two-dimensional attack surface value including a compute-level attack surface value and a network-level attack surface value for the first tenant. In some embodiments, the processing circuitry 56 includes further instructions executable by the processing circuitry 56 to configure the computing device 12 to determine a maximum exposure value for the first tenant for each host in the multi-tenant virtualized infrastructure on which there is at least one of the at least one virtual resource of the first tenant; and calculate an overall maximum exposure value for the first tenant by combining each determined maximum exposure value.

In other embodiments, the metric calculator 62 may be configured to cause the computing device 12 to calculate at least one security metric for virtual infrastructures of a tenant based on information associated with a cloud infrastructure. The security evaluator 64 may be configured to evaluate at least one security parameter for the tenant based on one or more of the at least one calculated security metric for monitoring a security level of the tenant relative to other tenants in a multi-tenant cloud.

In one embodiment, the processing circuitry 56 may be configured to collect the information associated with the cloud infrastructure from a software-defined network; and output the evaluated at least one security parameter to the tenant. In some embodiments, the processing circuitry 56 is further configured to: compare the evaluated at least one security parameter to a predetermined threshold to determine whether a security level of the virtual infrastructures of the tenant are in compliance. In some embodiments, the at least one security metric includes a normalized host sharing metric, a coverage metric and an abundance metric. In some embodiments, at least one of: the normalized host sharing metric is associated with a number of other tenants co-located within a host having at least one virtual machine of the tenant; the coverage metric is associated with a ratio of resources of the tenant corresponding to a common host in which there are other resources of at least one other tenant; and the abundance metric is associated with a number of resources of the tenant corresponding to a host divided by a total number of resources on the host. In some embodiments, at least one of: the normalized host sharing metric is calculated by $$\frac{T_{h,A} - 1}{T - 1},$$

where $T_{h,A}$ is a total number of tenants co-located within a host h having at least one virtual machine of the tenant A and T is a total number of tenants in a data center corresponding to the multi-tenant cloud; the coverage metric includes at least one of a host-level virtual machine coverage metric and a host-level flow coverage metric, the host-level virtual machine coverage metric being calculated as a ratio of virtual machines belonging to the tenant A located at the host h within which there is at least one other virtual machine belonging to another tenant B divided by a total number of virtual machines belonging to tenant A at the data center and the host-level flow coverage metric with respect to the tenant A and the host h being calculated as a ratio of flow rules that match to the virtual machines of the tenant A located at the host h divided by a total number of flows corresponding to all the virtual machines of tenant A at the data center, where h is common to the tenant A and the tenant B; and the abundance metric includes at least one of a host-level virtual machine abundance metric and a host-level flow abundance metric, the host-level virtual machine abundance metric being calculated as a ratio of the number of the virtual machines of the tenant B on the host h divided by a total number of virtual machines on the host h and the host-level flow abundance metric being calculated as a ratio of a number of flow rules of the virtual machines of the tenant B on the host h divided by a total number of flow rules on host h.

In some embodiments, the resources of the tenant include the virtual machines of the tenant and the flows corresponding to the virtual machines of the tenant. In some embodiments, the at least one security parameter includes a maximum proximity, a multi-tenancy attack surface, and a maximum exposure. In some embodiments, at least one of: the maximum proximity is evaluated for the tenant using the coverage metric and the maximum proximity represents a maximum coverage metric for the tenant relative to another tenant with resources that are co-resided with the resources of the tenant; the multi-tenancy attack surface is evaluated for the tenant within the host using the coverage metric and the normalized host sharing metric defined for the host and the multi-tenancy attack surface represents a set of resources for the tenant on the host that can be attacked; and the maximum exposure is evaluated for the tenant at host level using the coverage metric and the abundance metric at the host and the maximum exposure represents the exposure of the tenant in a zone with other tenants. In some embodiments, the multi-tenancy attack surface is evaluated for the tenant within the host at least by multiplying the coverage metric and the normalized host sharing metric defined for the host; and the maximum exposure is evaluated for the tenant at host level at least by multiplying the coverage metric and the abundance metric for the host. In some embodiments, the processing circuitry 56 is further configured to: after obtaining the multi-tenancy attack surface for the tenant for each host at a data center, calculate a total multi-tenancy attack surface for the tenant as a sum of the multi-tenancy attack surfaces for the tenant for each host multiplied by a severity weight. In some embodiments, the calculation of the total multi-tenancy attack surface for the tenant is at least a two-dimensional attack surface including a compute-level attack surface and a network-level attack surface for the tenant. In some embodiments, the processing circuitry 56 is further configured to: after obtaining the maximum exposure for the tenant for each host at a data center, calculate an overall maximum exposure for the tenant at a compute-level and a network-level defined as a compute-level maximum exposure and a network-level maximum exposure, respectively among all hosts at the data center having at least one virtual machine belonging to the tenant.

Figure 3:
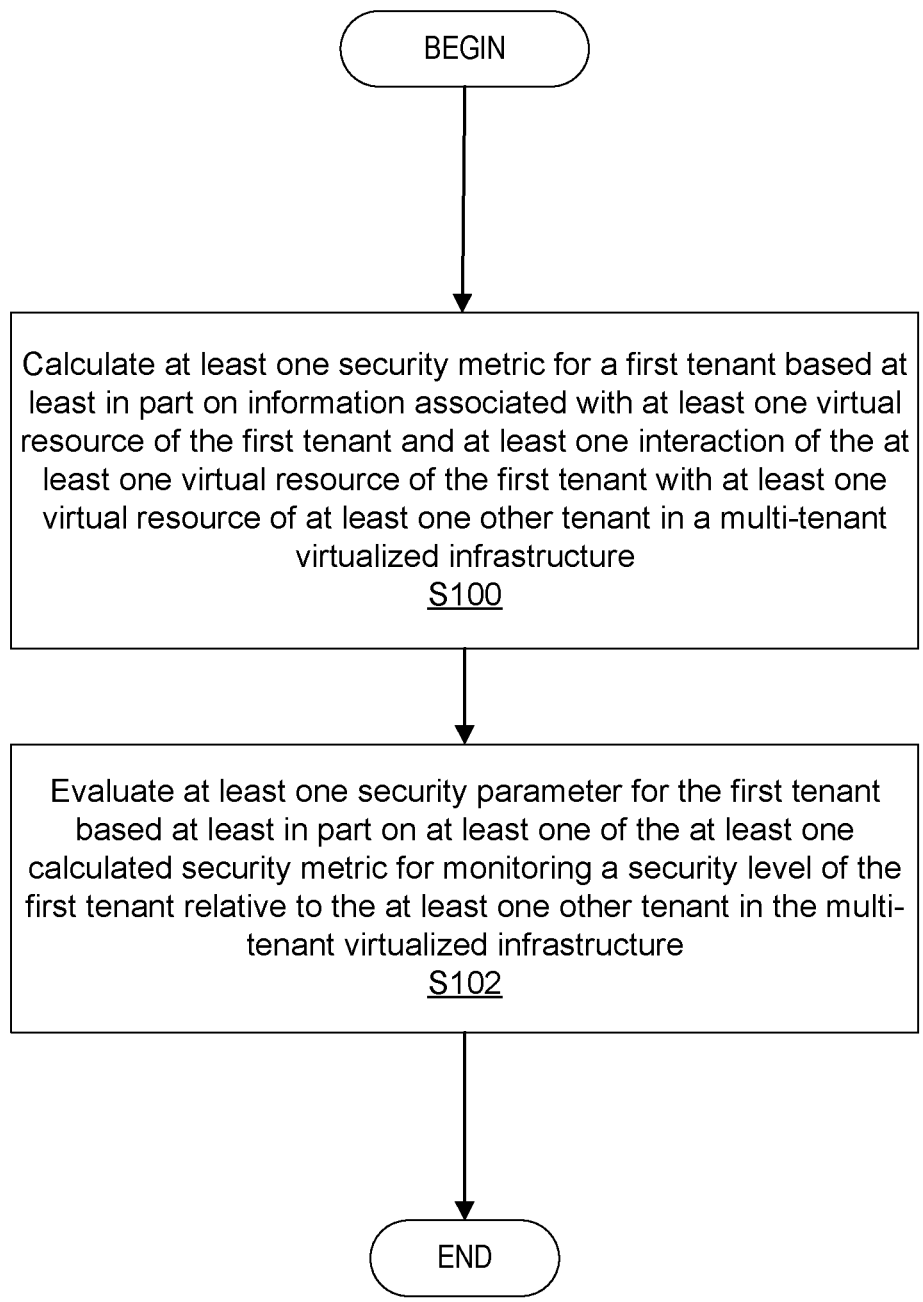
FIG. 3 is a flow chart illustrating an exemplary method according to some embodiments of the present disclosure.

Referring to FIG. 3, an exemplary method that may be implemented by a computing device, such as the computing device 12 for evaluating security for virtual infrastructures of tenants in a cloud environment is provided. One or more Blocks and/or functions and/or methods performed by the computing device 12 may be performed by one or more elements of computing device 12 such as by metric calculator 62 and/or security evaluator 64 in processing circuitry 56, processor 60, communication interface 54, etc. according to the example method. The method includes calculating (S100), such as via metric calculator 62, processing circuitry 56 and/or processor 60, at least one security metric for a first tenant based at least in part on information associated with at least one virtual resource of the first tenant and at least one interaction of the at least one virtual resource of the first tenant with at least one virtual resource of at least one other tenant in a multi-tenant virtualized infrastructure. The method includes evaluating (S102), such as via security evaluator 64, processing circuitry 56 and/or processor 60, at least one security parameter for the first tenant based at least in part on at least one of the at least one calculated security metric for monitoring a security level of the first tenant relative to the at least one other tenant in the multi-tenant virtualized infrastructure.

In some embodiments, each of the at least one virtual resource of the first tenant and the at least one virtual resource of the at least one other tenant includes at least one of a compute resource and a network resource. In some embodiments, the at least one interaction of the at least one virtual resource of the first tenant with the at least one virtual resource of the at least one other tenant includes at least one interaction between the at least one of the compute resource and the network resource of the first tenant and the at least one of the compute resource and the network resource of the at least one other tenant. In some embodiments, the method further comprises obtaining, such as via metric calculator 62 and/or security evaluator 64 in processing circuitry 56, processor 60 and/or communication interface 54, at least one weight, the at least one weight based at least in part on at least one vulnerability score of at least one known vulnerability associated with the at least one virtual resource of the first tenant. In some embodiments, the evaluating the at least one security parameter further comprises evaluating the at least one security parameter using the obtained at least one weight. In some embodiments, the method further comprises dynamically updating, such as via metric calculator 62 and/or security evaluator 64 in processing circuitry 56, processor 60 and/or communication interface 54, the at least one weight based on information from an exploitation database 30. In some embodiments, the at least one security metric includes at least one of a normalized host sharing metric, a coverage metric and an abundance metric.

In some embodiments, the normalized host sharing metric is based on a number of other tenants that are co-located within a host of the at least one virtual resource of the first tenant. In some embodiments, the coverage metric is based on a ratio of virtual resources of the first tenant on a host in which there are other virtual resources of the at least one other tenant to a total number of virtual resources of the first tenant in the multi-tenant virtualized infrastructure. In some embodiments, the abundance metric is based on a number of virtual resources of the first tenant on a host divided by a total number of virtual resources on the host. In some embodiments, the calculating the at least one security metric for the first tenant further comprises calculating a normalized host sharing metric according to $$\frac{T_{h,A} - 1}{T - 1},$$

where $T_{h,A}$ is a total number of other tenants that are co-located within a host h of the at least one virtual resource of the first tenant A and T is a total number of tenants in the multi-tenant virtualized infrastructure.

In some embodiments, the calculating the at least one security metric for the first tenant further comprises calculating a coverage metric, the coverage metric including at least one of a host-level virtual machine coverage metric and a host-level flow coverage metric, the host-level virtual machine coverage metric being calculated as a ratio of virtual machines belonging to the first tenant A located at the host h within which there is at least one other virtual machine belonging to the at least one other tenant B to a total number of virtual machines belonging to the first tenant A in the multi-tenant virtualized infrastructure and the host-level flow coverage metric with respect to the first tenant A and the host h being calculated as a ratio of flow rules that match to the virtual machines of the first tenant A located at the host h to a total number of flows corresponding to all the virtual machines of the first tenant A in the multi-tenant virtualized infrastructure, where h is common to the first tenant A and the at least one other tenant B. In some embodiments, the calculating the at least one security metric for the first tenant further comprises calculating an abundance metric, the abundance metric including at least one of a host-level virtual machine abundance metric and a host-level flow abundance metric, the host-level virtual machine abundance metric being calculated according to a number of virtual machines of the at least one other tenant B on a host h divided by a total number of virtual machines on the host h and the host-level flow abundance metric being calculated according to a number of flow rules of the virtual machines of the at least one other tenant B on the host h divided by a total number of flow rules on the host h.

In some embodiments, the evaluating the at least one security parameter for the first tenant further comprises evaluating at least one of a maximum proximity, a multi-tenancy attack surface, and a maximum exposure. In some embodiments, the evaluating the at least one security parameter for the first tenant further comprises evaluating a maximum proximity for the first tenant, the maximum proximity representing a maximum coverage metric for the first tenant relative to the at least one other tenant. In some embodiments, the evaluating the at least one security parameter for the first tenant further comprises evaluating a multi-tenancy attack surface for the first tenant, the multi-tenancy attack surface representing a set of virtual resources belonging to the first tenant on a host that can be attacked. In some embodiments, the evaluating the at least one security parameter for the first tenant further comprises evaluating a maximum exposure for the first tenant, the maximum exposure representing an exposure of the first tenant in a zone shared with the at least one other tenant.

In some embodiments, the evaluating the multi-tenancy attack surface for the first tenant further comprises multiplying a coverage metric and a normalized host sharing metric defined for the host. In some embodiments, the evaluating the maximum exposure for the first tenant further comprises multiplying a coverage metric and an abundance metric defined for a host. In some embodiments, the method further comprises determining, such as via metric calculator 62 and/or security evaluator 64 in processing circuitry 56, processor 60 and/or communication interface 54, a multi-tenancy attack surface value for the first tenant for each host in the multi-tenant virtualized infrastructure; and calculating, such as via metric calculator 62 and/or security evaluator 64 in processing circuitry 56, processor 60 and/or communication interface 54, a total multi-tenancy attack surface value for the first tenant as a sum of the multi-tenancy attack surface values for the first tenant for each host multiplied by a severity weight. In some embodiments, the calculating the total multi-tenancy attack surface value further comprises calculating the total multi-tenancy attack surface value as at least a two-dimensional attack surface value including a compute-level attack surface value and a network-level attack surface value for the first tenant. In some embodiments, the method further comprises determining, such as via metric calculator 62 and/or security evaluator 64 in processing circuitry 56, processor 60 and/or communication interface 54, a maximum exposure value for the first tenant for each host in the multi-tenant virtualized infrastructure on which there is at least one of the at least one virtual resource of the first tenant; and calculating, such as via metric calculator 62 and/or security evaluator 64 in processing circuitry 56, processor 60 and/or communication interface 54, an overall maximum exposure value for the first tenant by combining each determined maximum exposure value.

In another embodiment, the method includes calculating at least one security metric for virtual infrastructures of a tenant based on information associated with a cloud infrastructure; and evaluating at least one security parameter for the tenant based on one or more of the at least one calculated security metric for monitoring a security level of the tenant relative to other tenants in a multi-tenant cloud.

In some embodiments, the method further includes collecting the information associated with the cloud infrastructure from a software-defined network; and outputting the evaluated at least one security parameter to the tenant. In some embodiments, the method further includes comparing, such as via processing circuitry 56, the evaluated at least one security parameter to a predetermined threshold to determine whether a security level of the virtual infrastructures of the tenant are in compliance. In some embodiments, the at least one security metric includes a normalized host sharing metric, a coverage metric and an abundance metric. In some embodiments, at least one of: the normalized host sharing metric is associated with a number of other tenants co-located within a host having at least one virtual machine of the tenant; the coverage metric is associated with a ratio of resources of the tenant corresponding to a common host in which there are other resources of at least one other tenant; and the abundance metric is associated with a number of resources of the tenant corresponding to a host divided by a total number of resources on the host. In some embodiments, at least one of: the normalized host sharing metric is calculated by $$\frac{T_{h,A}-1}{T-1},$$

where $T_{h,A}$ is a total number of tenants co-located within a host h having at least one virtual machine of the tenant A and T is a total number of tenants in a data center corresponding to the multi-tenant cloud; the coverage metric includes at least one of a host-level virtual machine coverage metric and a host-level flow coverage metric, the host-level virtual machine coverage metric being calculated as a ratio of virtual machines belonging to the tenant A located at the host h within which there is at least one other virtual machine belonging to another tenant B divided by a total number of virtual machines belonging to tenant A at the data center and the host-level flow coverage metric with respect to the tenant A and the host h being calculated as a ratio of flow rules that match to the virtual machines of the tenant A located at the host h divided by a total number of flows corresponding to all the virtual machines of tenant A at the data center, where h is common to the tenant A and the tenant B; and the abundance metric includes at least one of a host-level virtual machine abundance metric and a host-level flow abundance metric, the host-level virtual machine abundance metric being calculated as a ratio of the number of the virtual machines of the tenant B on the host h divided by a total number of virtual machines on the host h and the host-level flow abundance metric being calculated as a ratio of a number of flow rules of the virtual machines of the tenant B on the host h divided by a total number of flow rules on host h.

In some embodiments, the resources of the tenant include the virtual machines of the tenant and the flows corresponding to the virtual machines of the tenant. In some embodiments, the at least one security parameter includes a maximum proximity, a multi-tenancy attack surface, and a maximum exposure. In some embodiments, the maximum proximity is evaluated for the tenant using the coverage metric and the maximum proximity represents a maximum coverage metric for the tenant relative to another tenant with resources that are co-resided with the resources of the tenant; the multi-tenancy attack surface is evaluated for the tenant within the host using the coverage metric and the normalized host sharing metric defined for the host and the multi-tenancy attack surface represents a set of resources for the tenant on the host that can be attacked; and the maximum exposure is evaluated for the tenant at host level using the coverage metric and the abundance metric at the host and the maximum exposure represents the exposure of the tenant in a zone with other tenants. In some embodiments, the multi-tenancy attack surface is evaluated for the tenant within the host at least by multiplying the coverage metric and the normalized host sharing metric defined for the host; and the maximum exposure is evaluated for the tenant at host level at least by multiplying the coverage metric and the abundance metric for the host. In some embodiments, the method further comprising: after obtaining the multi-tenancy attack surface for the tenant for each host at a data center, calculating, such as via processing circuitry 56, a total multi-tenancy attack surface for the tenant as a sum of the multi-tenancy attack surfaces for the tenant for each host multiplied by a severity weight. In some embodiments, calculating the total multi-tenancy attack surface for the tenant includes calculating the total multi-tenancy attack surface for the tenant as at least a two-dimensional attack surface including a compute-level attack surface and a network-level attack surface for the tenant. In some embodiments, the method further comprising, after obtaining the maximum exposure for the tenant for each host at a data center, calculating, such as via processing circuitry 56, an overall maximum exposure for the tenant at a compute-level and a network-level defined as a compute-level maximum exposure and a network-level maximum exposure, respectively among all hosts at the data center having at least one virtual machine belonging to the tenant.

Having described some embodiments of the hardware of such computing device 12 and some of the methods that may be implemented by the computing device 12, some of the example methods and techniques that may be used by the computing device 12 to measure tenant security will be described in more detail below with reference to FIGS. 4-9.

Building Block Metrics

In some embodiments, one or more of the building block metrics described below may be calculated via e.g., compute-level building block metric evaluator 22, network-level building block metric evaluator 24 and/or metric calculator 62.

Metric 1: Normalized Host Sharing Metric (NHS)

Normalized Host Sharing Metric

In one embodiment, a novel metric may be defined and may be called a normalized host sharing (NHS) metric (or host sharing metric) for a specific tenant A. For a given host $h \in h_A$, $h_A = \{h | \exists VM \in A: \text{locatedAt}(VM, h)$, the host-sharing metric may count the number of tenants co-located within the same host with at least one VM of a given tenant A. This tenant A could have signed a specific contract with the cloud provider to request a given security level for the alive VMs. The formula for host sharing may be:

$$HS(A,h) = T_{h,A} - 1.$$

The host-sharing metric can be normalized based on the total number of other tenants (T) in the data center to obtain a comparable metric in range [0,1]:

$$NHS(A, h) = \frac{T_{h,A} - 1}{T - 1}$$

Figure 4:
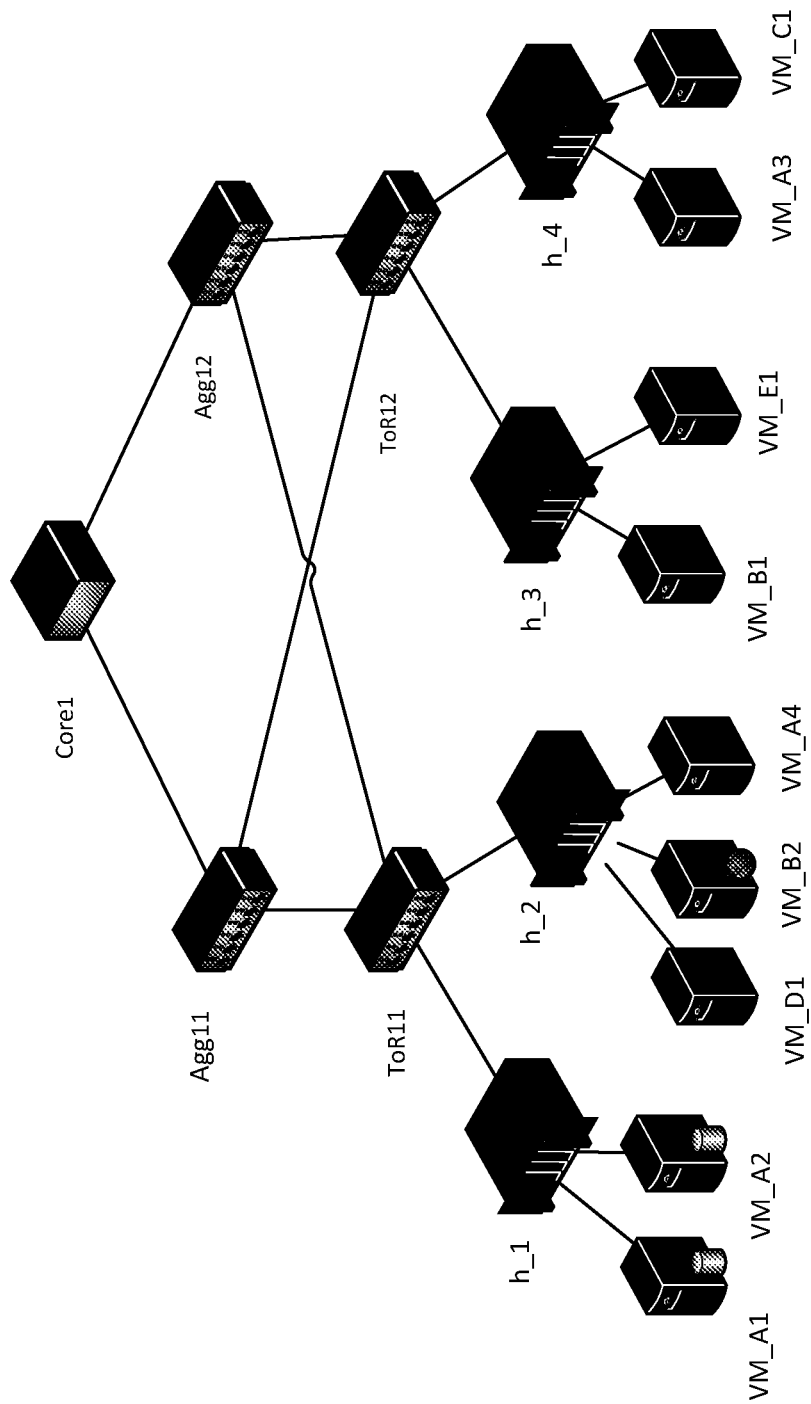
FIG. 4 is a schematic diagram of an example data cloud deployment according to some embodiments of the present disclosure.

FIG. 4 illustrates an example of Data Center Deployment.

Example 1: Host Sharing Metric

FIG. 4 demonstrates VM deployment in a datacenter for five tenants, as an illustrative example. Table 2 below shows the calculation results of the host sharing metrics. Computing this metric, such as via metric calculator 62 and/or processing circuitry 56, from tenant A's perspective, involves three hosts: $h_1$, $h_2$ and $h_4$. For example, $h_2$ hosts VMs from three tenants (e.g., tenant D, B and A); therefore, the host sharing is HS(A, h)=3−1=2; since there are five tenants in total (e.g., tenants A-E) in this data center, the normalized host sharing is $$NHS(A, h) = \frac{2}{5-1} = \frac{2}{4}.$$

TABLE 2

The calculation of host sharing metric related to example of FIG. 4

| Host | Host Sharing Metric | Normalized Host Sharing Metric |
|---|---|---|
| $h_1$ | 0 | 0 |
| $h_2$ | 2 | 2/4 |
| $h_4$ | 1 | 1/4 |

Normalized Zone Sharing Metric (NZS):

Some tenants may be interested in a specific zone where they have most important VMs deployed, e.g., webserver, database, etc. For example, in FIG. 4 tenant A deployed database and webserver on the VMs located on $h_1$ and $h_2$. Tenant A may focus on the sharing in this zone that is combined with $h_1$ and $h_2$. The normalized host sharing metric can be extended to a zone sharing metric as follows:

$$ZS(A,z) = T_{Z_{h,A}} - 1$$

And the normalized zone sharing metric may be:

$$NZS(A, z) = \frac{T_{z_{h,A}} - 1}{T - 1}$$

This NZS metric may extend the sharing from a host-level to the level of a zone of any size as defined by e.g. a tenant. This may provide the flexibility for tenants to generate and/or have monitored security levels of combined regions based on their own risk/requirements.

Example 2: Zone Sharing Metric

The zone sharing based on the example of FIG. 4 for tenant A (assume tenant A wants to calculate the sharing on the zone including both $h_1$ and $h_2$) is ZS(A, z)=3−1=2 and the normalized zone sharing is NZS(A, z)=2/4.

Normalized Datacenter Sharing Metric (NDS)

Data center level sharing metric may provide the comparable values for tenants to evaluate their security level at the data center and can be used to compare different deployments levels from different providers. Therefore, datacenter sharing metric could be extended from zone sharing metric to achieve the full picture of the sharing in the entire data center-level:

$$DS(A,D) = T_{D_{h,A}} - 1$$

And the normalized data center sharing may be:

$$NDS(A, D) = \frac{T_{D_{h,A}} - 1}{T - 1}$$

Example 3: Data Center Sharing Metric

The data center sharing in FIG. 4 for tenant A is DS(A, D)=4−1=3, and the normalized zone sharing is NDS(A, D)=3/5

Metric 2: Coverage Metrics

In one embodiment, a coverage metric may be used with two types of resources: virtual machine (VM) and flow and may, in some embodiments, also include the whole resource coverage in multi-abstraction levels: host level, zone level and data center level.

Host-Level Coverage Metrics

Host-level VM coverage metric calculates, such as via metric calculator 62 and/or processing circuitry 56, the ratio of VMs belonging to a given tenant A, located at host h in which there is also at least one VM from another tenant B.

$$VM_{coverage(A,h,B)} = \begin{cases} \frac{vm_{A,h}}{VM_A} & h \in h_A \cap h_B \\ 0 & \text{otherwise} \end{cases}$$

The host-level flow coverage metric with respect to the tenant A and a given host h is the ratio of the flows rules that matches to tenant A's VMs located at host h where h is common to tenant A and tenant B ($h \in h_A \cap h_B$).

$$Flow_{coverage(A,h,B)} = \begin{cases} \frac{flowsize(A, h)}{flowsize(A)} & h \in h_A \cap h_B \\ 0 & \text{otherwise} \end{cases}$$

In one example, the flowsize can be computed as follows. Let L be the total number of match bits for an openFlow rules (defined as a region in the space $\{0,1\}^L$), and a flow rule R specifying an exact match for n bits over L. Then the flowsize may be defined as:

$$flowsize(R) = 2^{L-n}.$$

For a given VM, v, the corresponding set of flow rules, namely, rules(v) may be the set of all flow entries where v appears either as a source or as a destination. Therefore, flowsize of v may be defined as the sum of the size of different rules in rules(v). For simplicity, we may consider that rules do not overlap.

$$flowsize(v) = \sum_{R_i \in rules(v)} flowsize(R_i)$$

Example 4: Flowsize

Table 3 below shows the example of OpenFlow rules based on FIG. 4. Two examples are shown for calculating flowsize. For example, rule R1 of vNetA1 and R1 of vNetB from Table 3 are in the space $\{0,1\}^{204}$; therefore, the flowsize for these two rules is $2^{204-204}=2^0=1$. For $R_2$, the flowsize for this rule can be calculated through the exact match bits: 12+48+32+24=116 bits in this rule; therefore, flowsize$(R_2)=2^{204-116}=2^{88}$.

TABLE 3

OpenFlow rules for FIG. 4

| Rule | Flow-ID | Src-MAC | Dst-MAC | Src-IP | Dst-IP | Src-PORT | Dst-PORT | Exact matches |
|---|---|---|---|---|---|---|---|---|
| vNetA1:R1 | 1*0001 | MAC(VM-A2) | MAC(VM-A3) | IP(VM-A2) | IP(VM-A3) | 80 | 80 | 204 |
| vNetA1:R2 | 1*0001 | MAC(VM-A1) | * | IP(VM-A1) | 192.20.15/24 | * | * | 116 |
| vNetB:R1 | 1*0002 | MAC(VM-B2) | MAC(VM-B1) | IP(VM-B2) | IP(VM-B1) | 20 | 20 | 204 |

Zone-Level Coverage Metrics

Tenants could pre-define a zone z that hosts important assets to calculate their coverage metrics in that zone. Both VM and Flow coverage can be extended to a zone level.

$$VM_{coverage(A,z,B)} = \begin{cases} \dfrac{vm_{A,z_{h,A}}}{VM_A} & h \in Z_{h_A} \cap Z_{h_B} \\ 0 & \text{otherwise} \end{cases}$$

$$Flow_{coverage(A,z,B)} = \begin{cases} \dfrac{flowsize(A, z_{h,A})}{flowsize(A)} & h \in Z_{h_A} \cap Z_{h_B} \\ 0 & \text{otherwise} \end{cases}$$

Data Center Level Coverage Metrics

Similar to the sharing metrics, the coverage metrics could be extended at the datacenter level to provide a full picture of the coverage.

$$DC_{coverage(A,D,B)} = \begin{cases} \dfrac{vm_{A,D_{h,A}}}{VM_A} & h \in D_{h_A} \cap D_{h_B} \\ 0 & \text{otherwise} \end{cases}$$

$$Flow_{coverage(A,D,B)} = \begin{cases} \dfrac{flowsize(A, D_{h,A})}{flowsize(A)} & h \in D_{h_A} \cap D_{h_B} \\ 0 & \text{otherwise} \end{cases}$$

Example 5: Coverage Metric

The same example in FIG. 4 may be used to calculate the coverage metrics, such as via metric calculator 62 and/or processing circuitry 56. For example, in $h_2$, tenant A's VM coverage is the ratio of VMs on this host (which is 1) to the total number of the VMs from tenant A in this data center (which is 4). Therefore, VM$_{coverage(A,h,B)}=\frac{1}{4}$.

Metric 3: Abundance Metrics

Host-Level Abundance Metrics

The VM abundance metric may be defined as the portion of the number of VMs of tenant B over total number of VMs (regardless the tenant) on host $h_A$.

$$VM_{Abundance(B,h)} = \begin{cases} \dfrac{VM_{B,h}}{VM_h} & \text{if } h \in h_B \cap h_A \\ 0 & \text{otherwise} \end{cases}$$

The flow abundance metric may be defined as the ratio of the number of flow rules of tenant B's VMs on host $h_A$.

$$Flow_{Abundance(B,h)} = \begin{cases} \dfrac{flowsize(B, h)}{flowsize(h)} & h \in h_A \cap h_B \\ 0 & \text{otherwise} \end{cases}$$

Zone-Level Abundance Metrics

Same as the previous building block metrics, abundance metrics can be easily extended to zone level for both VM and flow.

$$VM_{Abundance(B,z)} = \begin{cases} \dfrac{vm_{B,z_{h,A}}}{VM_Z} & h \in Z_{h_A} \cap Z_{h_B} \\ 0 & \text{otherwise} \end{cases}$$

$$Flow_{coverage(B,z)} = \begin{cases} \dfrac{flowsize(B, z_{h,A})}{flowsize(z)} & h \in Z_{h_A} \cap Z_{h_B} \\ 0 & \text{otherwise} \end{cases}$$

Data Center Level Abundance Metrics

Data center level abundance metrics demonstrate the overall measure for a given tenant with respect to another.

$$VM_{Abundance(B,D)} = \begin{cases} \dfrac{vm_{B,D_{h,A}}}{VM_D} & h \in D_{h_A} \cap D_{h_B} \\ 0 & \text{otherwise} \end{cases}$$

$$Flow_{coverage(B,D)} = \begin{cases} \dfrac{flowsize(B, D_{h,A})}{flowsize(D)} & h \in D_{h_A} \cap D_{h_B} \\ 0 & \text{otherwise} \end{cases}$$

Example 6: Abundance Metric

In FIG. 4, the abundance in $h_2$ for tenant B can be calculated, such as via metric calculator 62 and/or processing circuitry 56, based on the number of VMs on $h_2$ (which is 1) and the number of total VMs on $h_2$ (which is 3), $VM_{Abundance(B,h_2)} = 1/3$.

Figure 5:
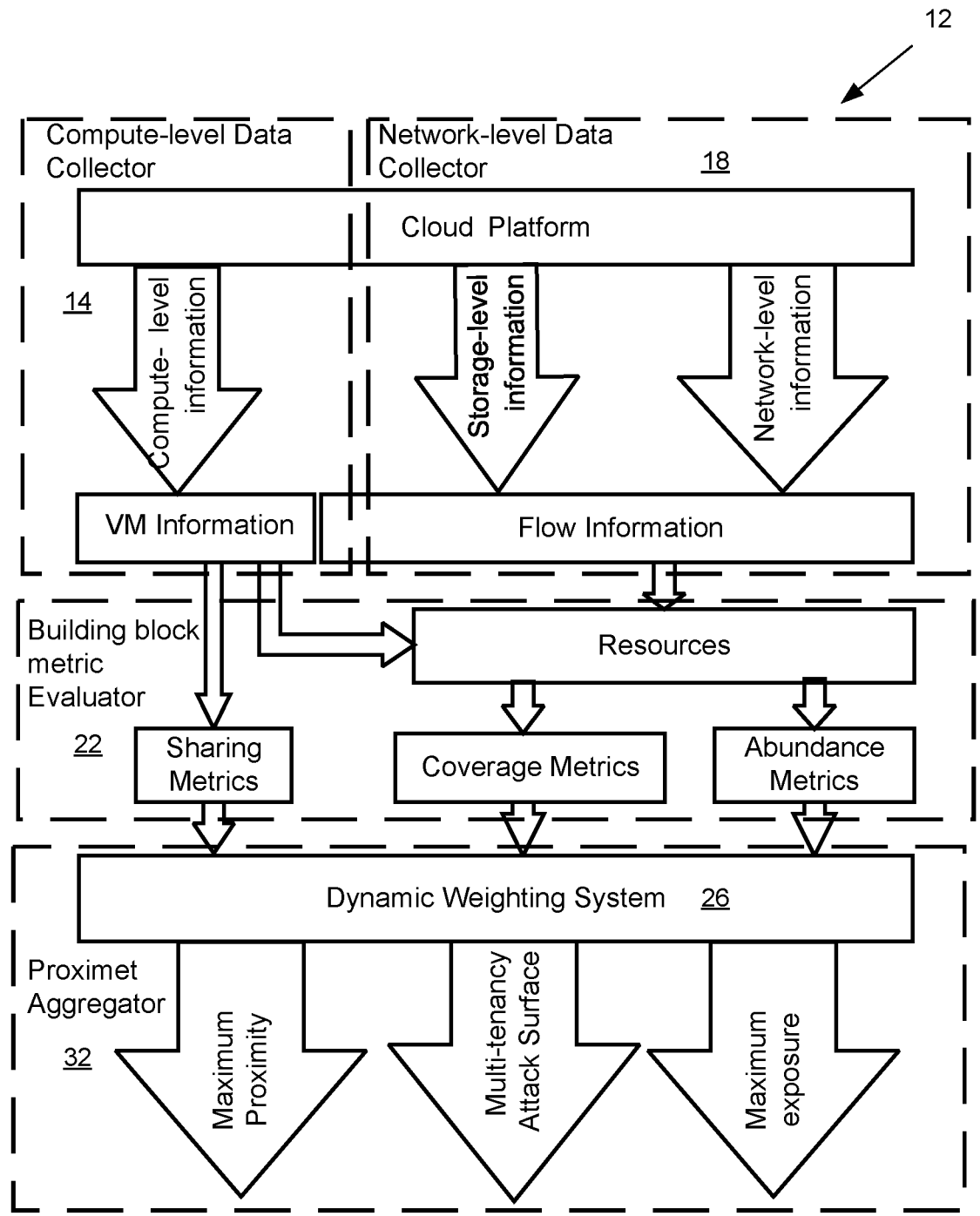
FIG. 5 is a block diagram illustrating the functionality and flow of inputs/outputs of the computing device of FIG. 1 according to some embodiments of the present disclosure.

Having described the three building block metrics that may be used with embodiments of the present disclosure, one example of the inner working of the computing device 12 based on these defined building block metrics follows, with reference to FIG. 5. After which, the disclosure will explain examples of each of some security parameters (e.g., maximum proximity, multi-tenancy attack surface, and maximum exposure) determined by the computing device 12 for virtual infrastructures of one or more tenants in more detail.

FIG. 5 illustrates an example functional diagram that demonstrates some of the inputs and outputs that may flow through the computing device 12. In particular, FIG. 5 illustrates some inputs that may be used for the building block metrics and the aggregator output methods that may be used to measure multiple security aspects.

Figure 6:
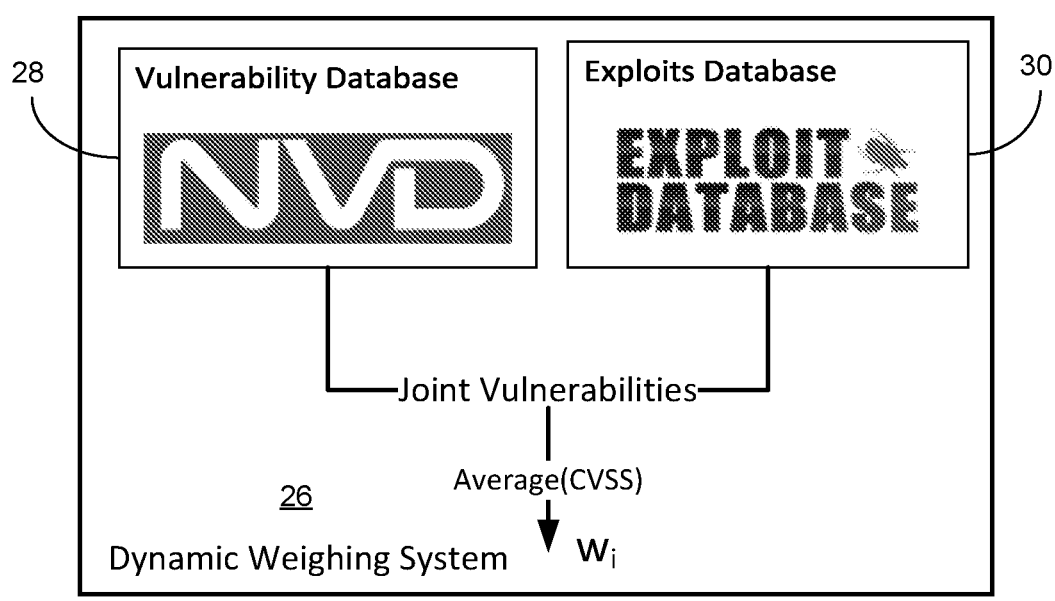
FIG. 6 is a block diagram of an exemplary dynamic weighting system according to some embodiments of the present disclosure.

After gathering the inputs for each metric (via e.g., the compute-level and network level data collectors 14 and 18 shown in FIG. 5), the computing device 12 may compute each building block metric (via e.g., the building block metrics evaluator 22 and/or 24) and then output the building block metrics as input for the dynamic weighting system 26 (a detailed diagram for an example weighting system 26 is illustrated in FIG. 6). Based on multi-aspects of security requests, the computing device 12 (e.g., via the Aggregator 32, security evaluator 64 and/or processing circuitry 56) may evaluate, calculate and/or output the three measurements/parameters (e.g., maximum proximity, multi-tenancy attack surface, and maximum exposure) that may be used to evaluate/determine a security/risk level for a given tenant.

FIG. 6 illustrates an example implementation of the dynamic weighting system 26. Such weighting system 26 may take a severity level of existing vulnerabilities from each category (e.g., via vulnerability database 28), e.g., a base score of vulnerabilities on hosts and VMs, into consideration to obtain a weight. In some embodiments, to achieve a more realistic weight, the Common Vulnerabilities and Exposures (CVEs) that have already been exploited from the exploit database 30 may be considered to reduce the effect of vulnerabilities that are not exploitable. Therefore, weights may change within time according to the exploitability of the CVEs. In some embodiments, the weights may be computed in real-time or on a periodic basis (e.g., dynamically), such as via weighting system 26 and/or processing circuitry 56. In some embodiments, for each metric, the base score of vulnerabilities for different related attacks can be used to generate a corresponding weight. For example, if attacks a1 . . . aN (where "N" can be any number greater than 1) can be performed through host co-residency, the average value of base score vulnerabilities may be assigned for the metric normalized to the total value of base scores for all attacks concerning all metrics.

In some embodiments, the weighting system takes the severity level of existing vulnerabilities from each category, i.e. base score of vulnerabilities on host and VMs, into consideration to obtain weight. To achieve more realistic weight, some embodiments may only consider the CVEs that have been already exploited (e.g., from exploit database). For example, for each metric, the base score of vulnerabilities for different related attacks can be used to generate the corresponding weight. Weights may be readjusted at runtime according to the exploited vulnerabilities. Weights may be used as input to the aggregator to evaluate the security parameters. In some embodiments, the composed security metrics measure the intensity/impact (e.g. maximum proximity) and the coverage/extent (e.g., maximum exposure) for a class of attacks on a tenant's virtual resources using a composition of the security metrics. The weights for this composition may be defined using the evaluation of the existing known vulnerabilities and the study of the existing attack methods (e.g., vulnerabilities vs. exploits).

Having described example calculations of some of the security metrics disclosed herein, some examples of the output methods (maximum proximity, multi-tenancy attack surface, and maximum exposure) that may be used in the computing device 12 are described in more detail below. In some embodiments, one or more of the security parameters described below may be evaluated via e.g., aggregator 32, processing circuitry 56 and/or security evaluator 64.

Maximum Proximity

In one embodiment, to generate a direct warning to cloud administrators and/or continuous auditing reports to tenants, a maximum proximity method may be determined to reveal the maximum of VMs/flows that can be co-resided with a same tenant. This method may not require a specific potential attacker as an input, and may include calculating, such as via security evaluator 64 and/or processing circuitry 56, a maximum proximation in VMs/flows level to present as an upper bound of risk level for one tenant.

Since malicious entities are generally uncertain, the maximum priority may be considered a lower bound of security level for a tenant (e.g., tenant A). The proximity of each tenant against tenant A could be calculated, such as via security evaluator 64 and/or processing circuitry 56, based on coverage metrics.

TABLE 4

Building block metrics for Maximum proximity

| Resources | Building block metrics | Maximum proximity |
|---|---|---|
| Compute-level | $VM_{coverage}(A)$ | $\underset{t \in T_c(A)}{Max} VM_{coverage}(A, t)$ |
| Network-level | $Flow_{coverage}(A)$ | $\underset{t \in T_c(A)}{Max} Flow_{coverage}(A, t)$ |

Table 4 shows the maximum proximity method building blocks. In one embodiment, the dynamic weighting system 26 may be used to generate weights, w, for the calculation of overall maximum proximity, which may be referred to as maxProximity. Maximum proximity may be output to either or both of the cloud provider and tenant. The resulting maximum proximity may be determined/evaluated, such as via security evaluator 64 and/or processing circuitry 56, as follows:

$$MaxProximity = w_0 * \underset{t \in T_c(A)}{Max} VM_{coverage}(A, t) + w_1 * \underset{t \in T_c(A)}{Max} Flow_{coverage}(A, t)$$

Trust-Based Maximum Proximity

In one embodiment, the requester tenant, for example tenant A, may assign a trust weight to a group of tenants. For example, company A may assign trust weight Tr to competitor tenants. Similarly, tenant A could assign the trust weight to each tenant to achieve multi-trust based maximum proximity. Table 5 below illustrates the building block metrics involved with Trust-based Maximum proximity.

TABLE 5

The trust based maximum proximity

| Resources | Building block metrics | Maximum proximity |
|---|---|---|
| Compute-level | $VM_{coverage}(A)$ | $\underset{t \in T_c(A)}{Max} Tr_i * VM_{coverage}(A, t)$ |
| Network-level | $Flow_{coverage}(A)$ | $\underset{t \in T_c(A)}{Max} Tr_i Flow_{coverage}(A, t)$ |

Example 7: Maximum Proximity

Figure 7:
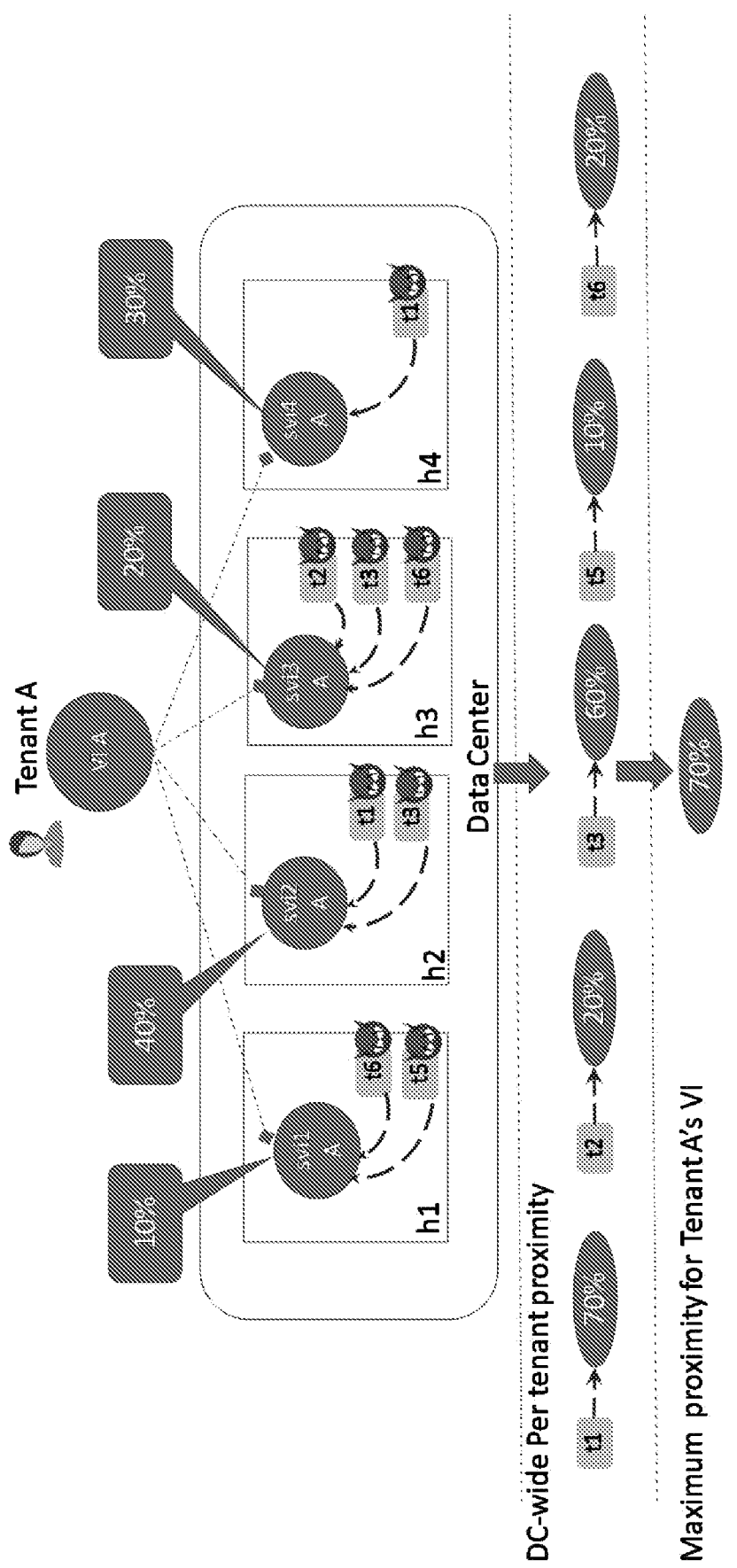
FIG. 7 is a schematic diagram illustrating an example of a maximum proximity determination method according to some embodiments of the present disclosure.

FIG. 7 illustrates a running example for the Maximum proximity method based on for example metric 2 (coverage metric). In this illustrative example, tenant A may be considered the security metric requester and t1-t6 represents the other tenants in the cloud data center environment. In FIG. 7, "VI A" is intended to indicate the virtual infrastructure (VI) from tenant A and the sub-virtual infrastructure (svi) represents the VMs in each host. The percentage (e.g., 10%) on top of each host (e.g., $h_1$) indicates the portion of VMs from tenant A that are located in such host.

Thus, the proximity between each tenant with tenant A may be calculated, such as via security evaluator 64 and/or processing circuitry 56, as shown below in Table 6.

TABLE 6

Calculation process for proximity

| Tenants | Hosts | | | | |
|---|---|---|---|---|---|
| | $h_1$ | $h_2$ | $h_3$ | $h_4$ | Overall |
| A\|$t_1$ | 0 | 40% | 0 | 30% | 70% |
| A\|$t_2$ | 0 | 0 | 20% | 0 | 20% |
| A\|$t_3$ | 0 | 40% | 20% | 0 | 60% |
| A\|$t_4$ | 0 | 0 | 0 | 0 | 0 |
| A\|$t_5$ | 10% | 0 | 0 | 0 | 10% |
| A\|$t_6$ | 10% | 0 | 20% | 0 | 30% |
| | | | | | MaxProximity = 70% |

According to Table 6, the maximum proximity for tenant A is 70% and it is related to tenant $t_1$. The maximum priority may represent the maximum risk level for tenant A in the data center. In one embodiment, if tenant A has entered into an agreement/contract with the cloud provider for a certain threshold based on the maximum proximity method, e.g., 60%, both cloud provider and tenant A may receive an auditing report based on the current cloud deployment. In this example, because the maximum proximity is above the threshold proximity (e.g., 70% maxProxmity is greater than the threshold of 60%) cloud provider should adjust the deployment to at least meet the threshold proximity and tenant A may be able to continuously monitor the maximum risk level to ensure compliance with the tenant's threshold.

In some embodiments, the maximum proximity method may be computed at zone-level and/or data center-level, such as via security evaluator 64 and/or processing circuitry 56, based on the host level formula described herein.

Multi-Tenancy Attack Surface

An attack surface concept may be used to provide a security metric from a software level, which may consider a potential or estimated security level of a software and may consider the set of resources that could be used during an attack process. Thus, in one embodiment, a multi-tenancy attack surface may be determined on the cloud level, such as via security evaluator 64 and/or processing circuitry 56.

According to one aspect, potential attacks may be divided into at least two categories, VMs and flows. For example, attackers could launch VMs to collocate with victim VMs on the same host to achieve a residency attack or at the same data center to perform power attacks. In the flow level, attackers could generate flows for information probing and/or distributed denial-of-service (DDoS) attacks.

Figure 8:
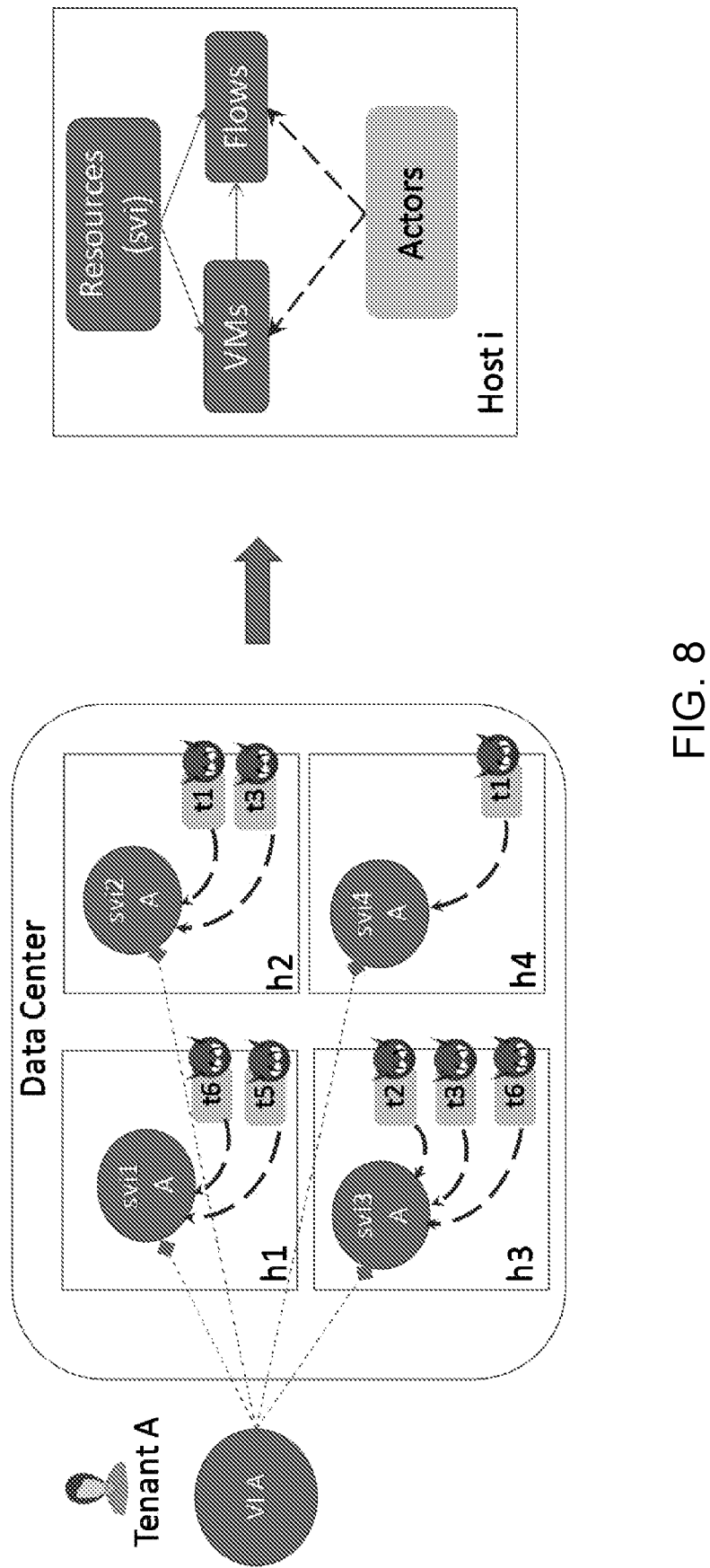
FIG. 8 is a schematic diagram illustrating an example of resources in a multi-tenancy attack surface according to some embodiments of the present disclosure.

The Multi-tenancy Attack Surface method may be based on the concept of attackability on each resource level (i.e., compute-level and network-level). FIG. 8 illustrates one example of resources associated with a multi-tenancy attack surface.

FIG. 8 shows an example of the resources that may be defined in a multi-tenancy attack surface method according to this disclosure. The actors in FIG. 8 are the tenants sharing the same host as the victim. Actors may have multiple VMs that share resources with the victim tenant A and may manipulate their VMs to generate malicious flows, as indicated by the dotted lines in FIG. 8.

Table 7 below shows an example of how to calculate resources for each host.

TABLE 7

Building block metrics used in the Multi-tenancy Attack Surface method at host-level

| Resources | Building block metrics | Attackability |
|---|---|---|
| Compute-Level | $VM_{coverage}(A)$ | AC(A, h) = $VM_{coverage}(A, h)$ * NHS(A, h) |
| Network-Level | $Flow_{coverage}(A)$ | AF(A, h) = $Flow_{coverage}(A, h)$ * NHS(A, h) |
| * | NHS(A, h) | * |

On the compute-level, resources may be defined as the shared VMs on the same level. Generally, the more the shared VMs the larger the attack surface. The $VM_{coverage}$ may be applied to calculate this type of resources. On the network-level, resources may be modeled by the shared flows. Generally, the larger the shared flows the larger attack surface. Therefore, the $Flow_{coverage}$ may be calculated to represent an attack surface for the type of resources.

Normalized host sharing (i.e., metric 1 from the building block metrics) may be used to reveal the exposure rate for the resources on the host level against all the other tenants that share the same physical machine. Generally, more tenants on the same host indicates a higher exposure for this svi. Furthermore, NHS may provide the attack likelihood for this particular svi. Attackability at a given host may be modeled as a multiplication of the risk of coverage and the attack likelihood.

After obtaining the attackability for each host, the overall/total attackability at the compute-level and network-level may be defined as a sum of the attackability of each host, as shown for example in Table 8 below. In some embodiments, the term "attackability" and "multi-tenancy attack surface" may be used herein interchangeably.

TABLE 8

Multi-tenancy Attack Surface Method

| Multi-tenancy attack surface | Compute-level attack surface ACR(A) | Network-level attack surface ANR(A) |
|---|---|---|
| < ACR, ANR > | $w_0 * \sum_{h \in h(A)} AC(A, h)$ | $w_1 * \sum_{h \in h(A)} AF(A, h)$ |

With the overall attackability, the multi-tenancy attack surface may be defined as the set of two-dimensional attackabilities, e.g., the compute-level resources attackability and the network/flow resource attackability, denoted herein as ACR and ANR, respectively. ACR may be considered the overall attackability from the compute-level and may be multiplied with severity weight, $w_0$, which can be obtained from dynamic weighting system 26, as described above. Similarly, ANR may be considered the overall attackability from network-level multiplied with severity weight, $w_1$. Such two-dimensional multi-tenancy attack surface shows the potential attacks from both compute-level and network-level.

Example 8: Multi-Tenancy Attack Surface

Figure 9:
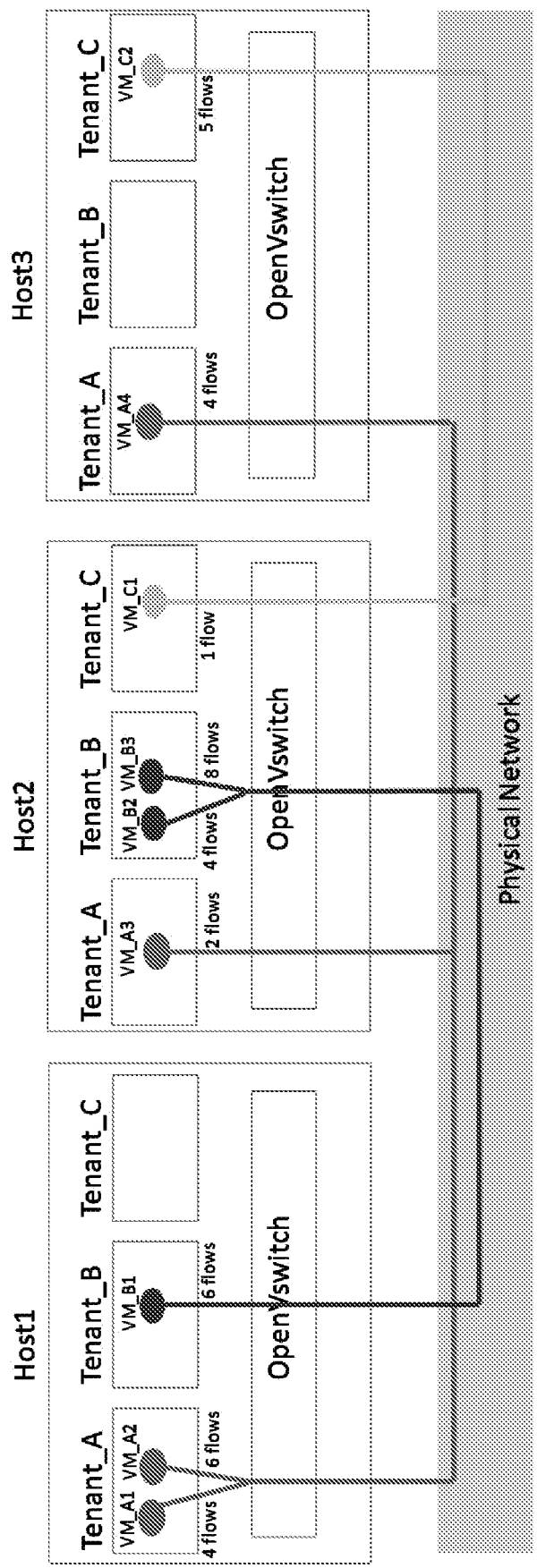
FIG. 9 is a block diagram illustrating an exemplary deployment of tenants' virtual infrastructure according to some embodiments of the present disclosure.

FIG. 9 illustrates a deployment of tenants' virtual infrastructure and Table 9 below illustrates the example VM and flow information.

TABLE 9

VM and Flow information for FIG. 9

| Tenants | VMs | Number of flows |
|---|---|---|
| Tenant_A | VM_A1 | 4 |
| | VM_A2 | 6 |
| | VM_A3 | 2 |
| | VM_A4 | 4 |
| Tenant_B | VM_B1 | 6 |
| | VM_B2 | 4 |
| | VM_B3 | 8 |
| Tenant_C | VM_C1 | 1 |
| | VM_C2 | 5 |

In this example, it may be assumed that tenant A files a security check to cloud provider to output a multi-tenancy attack surface. In one embodiment, to calculate multi-tenancy attack surface one or more of the following steps may be performed by computing device 12 e.g., via metric calculator 62, security evaluator 64 and/or processing circuitry 56:

Collect information for resources (e.g., VM and flows).
Calculate NHS in terms of tenant A.
Convert resources into an attackability parameter, AC and AF, on the host level (e.g., Table 7).
Calculate a two-dimensional attack surface based on the weight from dynamic weighting system and the sum of the attackability on each host (e.g., Table 8).

Table 10 below demonstrates the NHS calculation for each host from FIG. 9. For example, Host 1, $h_1$ has two tenants, thus, $$NHS = \frac{2-1}{3-1} = 0.5.$$

TABLE 10

VM/Flow information in the Data center and NHS Calculation Result

| | Tenant_A | | Tenant_B | | Tenant_C | | |
|---|---|---|---|---|---|---|---|
| | NA_VMs | NA_Flows | NB_VMs | NB_Flows | NC_VMs | NC_Flows | NHS |
| Host1 | 2 | 10 | 1 | 6 | 0 | 0 | 0.5 |
| Host2 | 1 | 2 | 2 | 12 | 1 | 1 | 1 |
| Host3 | 1 | 4 | 0 | 0 | 1 | 5 | 0.5 |

Table 11 below shows an example of the detailed calculation process (that may be performed by computing device 12, such as via metric calculator 62, security evaluator 64 and/or processing circuitry 56) to obtain overall attackability on both compute-level and network-level for the data center shown in FIG. 9. For example, host 2 has one VM from tenant A with the $VM_{coverage}=\frac{1}{4}=0.25$. Since the NHS=1 on host 2, the compute-level attackability is AC=0.25*1=0.25 After summing up the attackability on each host, we have overall attackability on compute-level AC=0.625, and network-level AF=0.562. With the weights generated from dynamic weighting system 26, the multi-tenancy attack surface can be calculated for tenant A as $<w_0*0.625, w_1*0.562>$.

TABLE 11

Attackability Calculation Result

| Host/resource coverage | Per-host VM-coverage for Tenant_A | Per-host Flow coverage for Tenant_A | NHS | AC (A, h) | AF (A, h) |
|---|---|---|---|---|---|
| Host1 | $\frac{2}{4} = 0.5$ | $\frac{10}{16} = 0.625$ | 0.5 | 0.25 | 0.3125 |
| Host2 | $\frac{1}{4} = 0.25$ | $\frac{2}{16} = 0.125$ | 1 | 0.25 | 0.125 |
| Host3 | $\frac{1}{4} = 0.25$ | $\frac{4}{16} = 0.25$ | 0.5 | 0.125 | 0.125 |
| Sum | | | | 0.625 | 0.562 |

Maximum Exposure

According to yet another security technique, an exposure level of a given tenant inside a cloud data center may be calculated, such as via security evaluator 64 and/or processing circuitry 56. In sociology, an interaction index may be applied as a measurement of the exposure of minority group members to members of a majority group as a minority-weighted average of the majority proportion of the population in each area unit. The interaction index can be used to calculate the sum of the portion of minority members in a given area and multiply with the portion of the majority group in same area.

Inspired from the interaction index from an unrelated art, sociology, exposure of a given tenant A to other tenants can be defined as the multiplication of the coverage metric (the portion of tenant A in a host/zone/data center) and the abundance metric (the portion of another tenant in the same host/zone/datacenter). This maximum exposure method may be considered a reflection of the exposure of the given tenant in a fixed zone with any other tenant.

TABLE 12

Building block metrics used in maximum exposure methods at host-level

| Resources | Building block of metrics | Exposure |
|---|---|---|
| Compute-level | VM_coverage (A, h, B), $VM_{Abundance}(B, h)$ | $VM_{Explosure(A, B, h)} = VM_{coverage}(A, h, B) * VM_{Abundance}(B, h)$ |
| Network-level | $flow_{coverage}(A, h, B)$, $flow_{Abundance}(B, h)$ | $F_{Explosure(A, B, h)} = flow_{coverage}(A, h, B) * flow_{Abundance}(B, h)$ |

Similar to the previous output methods described above (i.e., maximum proximity and attack surface), exposure may have two abstraction levels, namely, the compute-level and network-level. In one embodiment, to define the maximum exposure, the exposure on a given zone may be defined, and may start with the host. Table 12 shows the exemplary exposure formulas for both compute-level and network-level. Compute-level exposure may be considered to capture the VM exposures between the given tenant A and another tenant B and the compute-level exposure may capture the flow interactions between tenant A and tenant B based on flow rules. Table 13 below demonstrates an example of the maximum exposure method based on both compute-level and network-level.

TABLE 13

Maximum exposure method/technique

| Resources | Maximum Exposure |
|---|---|
| Compute-level | $\underset{t \in T_C(A)}{\text{Max}} VM_{Exposure(A,t)} = \underset{t \in T_C(A)}{\text{Max}} VM_{coverage}(A, h, t) * VM_{Abundance}(t, h)$ |
| Network-level | $\underset{t \in T_C(A)}{\text{Max}} F_{Exposure(A,t)} = \underset{t \in T_C(A)}{\text{Max}} flow_{coverage}(A, h, t) * flow_{Abundance}(t, h)$ |

Example 9: Maximum Exposure

Using FIG. 9 in this example, to calculate maximum exposure in a given zone with a given tenant, one or more of the following steps may be performed, such as via metric calculator 62, security evaluator 64 and/or processing circuitry 56:

Collect information from compute-level and network-level (e.g., via the collectors shown in FIGS. 1 and 5).

Build a table with VM/flow information for each tenant in each host for further calculations.

Calculate coverage metrics for the given tenant A (e.g., via the evalulator(s) shown in FIGS. 1 and 5).

Calculate abundance metrics for tenant A with other tenants (e.g., via the evalulator(s) shown in FIGS. 1 and 5).

Calculate the exposure metric on the host level and aggregate it to zone and/or datacenter level based on the requests from security metric requester (e.g., tenant A) (e.g., via the evalulator(s) shown in FIGS. 1 and 5).

Generate maximum exposure from the exposure sets between tenant A and all the other tenants (e.g., via the evalulator(s) shown in FIGS. 1 and 5).

Aggregate maximum exposure in different abstraction levels with weights, w, that are generated by the dynamic weighting system.

Table 14 below demonstrates exemplary calculated results from coverage metrics and abundance metrics corresponding to the data center shown in FIG. 9. Since the calculation of coverage metrics have already been explained in example 8 above, only the example calculation of abundance metrics in this example will be described here. For example, in host 2, the number of VMs that belong to tenant B is two and the total number of VMs on this host is four, as can be seen in FIG. 9. Therefore, $VM_{abundance}(B, h_2)=2/4=0.5$.

TABLE 14

The resulting table with example coverage metrics and abundance metrics

| Host | Per-host VM-coverage for Tenant_A | Per-host Flow coverage for Tenant_A | Abundance of Tenant_B VM-level | Abundance of Tenant_B Flow_level | Abundance of Tenant_C VM-level | Abundance of Tenant_C Flow-level |
|---|---|---|---|---|---|---|
| Host 1 | 2/4 = 0.5 | 10/16 = 0.625 | 1/3 = 0.33 | 6/16 = 0.375 | 0/3 = 0 | 0/16 = 0 |
| Host 2 | 1/4 = 0.25 | 2/16 = 0.125 | 2/4 = 0.5 | 12/15 = 0.8 | 1/4 = 0.25 | 1/15 = 0.066 |
| Host 3 | 1/4 = 0.25 | 4/16 = 0.25 | 0/2 = 0 | 0/9 = 0 | 1/4 = 0.5 | 5/9 = 0.55 |

After obtaining the coverage metrics and abundance metrics 5, the exposure on each host may be calculated, such as via security evaluator 64 and/or processing circuitry 56, as shown, for example, in Table 15 below. For example, in host 2, we have $VM_{exposure}(A, B, h_2)=VM_{coverage}(A, h_2, B)*VM_{Abundance}(B, h_2)=0.25*0.5=0.125$

TABLE 15

The calculation results for exposure method example

| Host | Exposure to Tenant_B VM-level | Exposure to Tenant_B Flow-level | Exposure to Tenant_C VM-level | Exposure to Tenant_C Flow-level |
|---|---|---|---|---|
| Host1 | 0.5*0.33 = 0.165 | 0.625*0.375 = 0.234 | 0.5*0 = 0 | 0.625*0 = 0 |
| Host2 | 0.25*0.5 = 0.125 | 0.125*0.8 = 0.1 | 0.25*0.25 = 0.062 | 0.125*0.66 = 0.082 |
| Host3 | 0.25*0 = 0 | 0.25*0 = 0 | 0.25*0.5 = 0.125 | 0.25*0.55 = 0.137 |
| Sum | 0.29 | 0.334 | 0.187 | 0.219 |

Thus, the maximum VM exposure and the maximum flow exposure in the example may be determined, such as via security evaluator 64 and/or processing circuitry 56, as the maximum of the sums, e.g., max(0.29, 0.187)=0.29 and max(0.334, 0.219)=0.334, respectively. Based on these results, the aggregated maximum exposure for tenant A is MaxExposure=$w_0$*0.29+$w_1$*0.334.

In addition, some embodiments of the present disclosure may be triggered as a new evaluation for each tenant sharing the same physical infrastructure based on cloud management events, like new VMs, virtual net creation in the same physical environment, etc. Such events may trigger re-calculating the security measurements based on changes in the sharing of different physical resources dedicated to different virtual resources, this being due at least in part to cloud management events like creating new virtual machines (VM) or migrating existing VMs. For example, when a new VM from another tenant is created in a physical node hosting an existing tenant's VM, the entire security measures for at least that particular node may be re-computed using the techniques disclosed herein. Therefore, the cloud management event (e.g., creation of new VM) can trigger a change in the virtual resources (between a first tenant and at least one other tenant), which in turn can effect the interactions at compute-level and network-level between virtual resources from the first and the at least one other tenant. Therefore, such changes may trigger a new evaluation of the security measurements, metrics and/or parameters as discussed herein and the techniques disclosed herein may be used to dynamically (e.g., periodically, trigger-based, etc.) update security calculations and/or evaluations based e.g., on such virtual infrastructure cloud management events.

Thus, some embodiments of the disclosure have been provided to evaluate various aspects of security for a tenant within a multi-tenant cloud environment. Some embodiments include a novel security evaluation system, apparatus and/or method, which combine a set of virtual network-level as well as compute-level measurements for virtual infra-structures in order to quantitatively evaluate the security level of tenants' deployments in an SDN-based cloud. Some embodiments provide for a system, apparatus and/or method that quantitatively evaluates the proximity between different virtual infrastructure deployments, that quantitatively evaluates the potential attackability risk between different virtual infrastructure deployments, and that quantitatively evaluates the potential maximum damage per tenant virtual infrastructure deployment using novel metrics calculations, which may include metrics for VM and flow coverage and abundance, as well as, normalized host sharing metrics. Accordingly, some embodiments of the present disclosure may advantageously improve security concerns associated with sharing tenancy in a cloud environment among arms-length/distrusted tenants.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A computing device for evaluating security for virtualized infrastructures of tenants in a cloud environment, the computing device comprising processing circuitry including instructions executable by the processing circuitry to configure the computing device to:
   calculate at least one security metric for a first tenant based at least in part on information associated with at least one virtual resource of the first tenant and at least one interaction of the at least one virtual resource of the first tenant with at least one virtual resource of at least one other tenant in a multi-tenant virtualized infrastructure;
   evaluate at least one security parameter for the first tenant based at least in part on at least one of the at least one calculated security metric for monitoring a security level of the first tenant relative to the at least one other tenant in the multi-tenant virtualized infrastructure;
   determine a multi-tenancy attack surface value for the first tenant for each host in the multi-tenant virtualized infrastructure; and
   calculate a total multi-tenancy attack surface value for the first tenant as a sum of the multi-tenancy attack surface values for the first tenant for each host multiplied by a severity weight.

2. The computing device of claim 1, wherein each of the at least one virtual resource of the first tenant and the at least one virtual resource of the at least one other tenant includes at least one of a compute resource and a network resource.

3. The computing device of claim 2, wherein the at least one interaction of the at least one virtual resource of the first tenant with the at least one virtual resource of the at least one other tenant includes:
   at least one interaction between the at least one of the compute resource and the network resource of the first tenant and the at least one of the compute resource and the network resource of the at least one other tenant.

4. The computing device of claim 1, wherein the processing circuitry includes further instructions executable by the processing circuitry to configure the computing device to:
   obtain at least one weight, the at least one weight based at least in part on at least one vulnerability score of at least one known vulnerability associated with the at least one virtual resource of the first tenant.

5. The computing device of claim 4, wherein the processing circuitry includes further instructions executable by the processing circuitry to configure the computing device to evaluate the at least one security parameter using the obtained at least one weight.

6. The computing device of claim 4, wherein the processing circuitry includes further instructions executable by the processing circuitry to configure the computing device to:
   dynamically update the at least one weight based on information from an exploitation database.

7. The computing device of claim 1, wherein the at least one security metric includes at least one of a normalized host sharing metric, a coverage metric and an abundance metric.

8. The computing device of claim 7, wherein:
   the normalized host sharing metric is based on a number of other tenants that are co-located within a host of the at least one virtual resource of the first tenant;
   the coverage metric is based on a ratio of virtual resources of the first tenant on a host in which there are other virtual resources of the at least one other tenant to a total number of virtual resources of the first tenant in the multi-tenant virtualized infrastructure; and
   the abundance metric is based on a number of virtual resources of the first tenant on a host divided by a total number of virtual resources on the host.

9. The computing device of claim 1, wherein the processing circuitry includes further instructions executable by the processing circuitry to configure the computing device to calculate the at least one security metric for the first tenant by:
   calculating a normalized host sharing metric according to $$\frac{T_{h,A} - 1}{T - 1},$$

where $T_{h,A}$ is a total number of other tenants that are co-located within a host h of the at least one virtual resource of the first tenant A and T is a total number of tenants in the multi-tenant virtualized infrastructure.

10. The computing device of claim 1, wherein the processing circuitry includes further instructions executable by the processing circuitry to configure the computing device to calculate the at least one security metric for the first tenant by:
   calculating a coverage metric, the coverage metric including at least one of a host-level virtual machine coverage metric and a host-level flow coverage metric, the host-level virtual machine coverage metric being calculated as a ratio of virtual machines belonging to the first tenant A located at the host h within which there is at least one other virtual machine belonging to the at least one other tenant B to a total number of virtual machines belonging to the first tenant A in the multi-tenant virtualized infrastructure and the host-level flow coverage metric with respect to the first tenant A and the host h being calculated as a ratio of flow rules that match to the virtual machines of the first tenant A located at the host h to a total number of flows corresponding to all the virtual machines of the first tenant A in the multi-tenant virtualized infrastructure, where h is common to the first tenant A and the at least one other tenant B.

11. The computing device of claim 1, wherein the processing circuitry includes further instructions executable by the processing circuitry to configure the computing device to calculate the at least one security metric for the first tenant by:
   calculating an abundance metric, the abundance metric including at least one of a host-level virtual machine abundance metric and a host-level flow abundance metric, the host-level virtual machine abundance metric being calculated according to a number of virtual machines of the at least one other tenant B on a host h divided by a total number of virtual machines on the host h and the host-level flow abundance metric being calculated according to a number of flow rules of the virtual machines of the at least one other tenant B on the host h divided by a total number of flow rules on the host h.

12. The computing device of claim 1, wherein the at least one security parameter includes at least one of a maximum proximity, a multi-tenancy attack surface, and a maximum exposure.

13. The computing device of claim 1, wherein the processing circuitry includes further instructions executable by the processing circuitry to configure the computing device to evaluate the at least one security parameter for the first tenant by:
evaluating a maximum proximity for the first tenant, the maximum proximity representing a maximum coverage metric for the first tenant relative to the at least one other tenant.

14. The computing device of claim 1, wherein the processing circuitry includes further instructions executable by the processing circuitry to configure the computing device to evaluate the at least one security parameter for the first tenant by:
evaluating a multi-tenancy attack surface for the first tenant, the multi-tenancy attack surface representing a set of virtual resources belonging to the first tenant on a host that can be attacked.

15. The computing device of claim 1, wherein the processing circuitry includes further instructions executable by the processing circuitry to configure the computing device to evaluate the at least one security parameter for the first tenant by:
evaluating a maximum exposure for the first tenant, the maximum exposure representing an exposure of the first tenant in a zone shared with the at least one other tenant.

16. The computing device of claim 14, wherein the multi-tenancy attack surface is evaluated for the first tenant by multiplying a coverage metric and a normalized host sharing metric defined for the host.

17. The computing device of claim 16, wherein the maximum exposure is evaluated for the first tenant by multiplying a coverage metric and an abundance metric defined for a host.

18. The computing device of claim 1, wherein the processing circuitry includes further instructions executable by the processing circuitry to configure the computing device to calculate the total multi-tenancy attack surface value as at least a two-dimensional attack surface value including a compute-level attack surface value and a network-level attack surface value for the first tenant.

19. The computing device of claim 1, wherein the processing circuitry includes further instructions executable by the processing circuitry to configure the computing device to:
determine a maximum exposure value for the first tenant for each host in the multi-tenant virtualized infrastructure on which there is at least one of the at least one virtual resource of the first tenant; and
calculate an overall maximum exposure value for the first tenant by combining each determined maximum exposure value.

20. A method implemented by a computing device for evaluating security for virtualized infrastructures of tenants in a cloud environment, the method comprising:
calculating at least one security metric for a first tenant based at least in part on information associated with at least one virtual resource of the first tenant and at least one interaction of the at least one virtual resource of the first tenant with at least one virtual resource of at least one other tenant in a multi-tenant virtualized infrastructure;
evaluating at least one security parameter for the first tenant based at least in part on at least one of the at least one calculated security metric for monitoring a security level of the first tenant relative to the at least one other tenant in the multi-tenant virtualized infrastructure;
determining a multi-tenancy attack surface value for the first tenant for each host in the multi-tenant virtualized infrastructure; and
calculating a total multi-tenancy attack surface value for the first tenant as a sum of the multi-tenancy attack surface values for the first tenant for each host multiplied by a severity weight.

* * * * *